(12) United States Patent
Tanaka et al.

(10) Patent No.: US 7,581,564 B2
(45) Date of Patent: Sep. 1, 2009

(54) PROTECTOR

(75) Inventors: Nobuyoshi Tanaka, Yokkaichi (JP);
Masato Ibaraki, Yokkaichi (JP);
Tsutomu Sakata, Yokkaichi (JP);
Toshitsugu Morii, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 12/116,376

(22) Filed: May 7, 2008

(65) Prior Publication Data

US 2008/0277015 A1 Nov. 13, 2008

(30) Foreign Application Priority Data

May 7, 2007 (JP) ............................. 2007-122650
May 9, 2007 (JP) ............................. 2007-124846
Jun. 4, 2007 (JP) ............................. 2007-148319

(51) Int. Cl.
*F16L 21/00* (2006.01)

(52) U.S. Cl. ..................... 138/110; 138/156; 174/71 R; 174/72 A; 174/92; 285/419; 285/903; 285/921

(58) Field of Classification Search ................. 138/110, 138/114, 156; 174/481, 135, 71 R, 72 A, 174/92; 285/419, 903, 921
See application file for complete search history.

(56) References Cited

U.S. PATENT DOCUMENTS 3,711,632 A * 1/1973 Ghirardi ..................... 174/135

3,711,633 A * 1/1973 Ghirardi et al. ............. 174/135
4,795,197 A * 1/1989 Kaminski et al. ............. 285/12
4,797,512 A * 1/1989 Kumagai et al. ............ 174/135
5,046,766 A * 9/1991 Lomberty et al. ........... 285/419
D363,977 S * 11/1995 Streit ........................ D23/263
6,875,918 B2 * 4/2005 Sudo et al. .................. 174/363
7,119,275 B2 * 10/2006 Suzuki et al. ............... 174/503

FOREIGN PATENT DOCUMENTS

DE          10139740      4/2003
JP          8-145241      6/1996
JP          9-294320     11/1997

* cited by examiner

*Primary Examiner*—Patrick F Brinson
(74) *Attorney, Agent, or Firm*—Gerald E. Hespos; Anthony J. Casella

(57) ABSTRACT

A protector (10) has two half members (20, 40) forming a tubular shape upon being assembled. One half member (20) includes a pair of temporary fixing ribs (26A, 26B) projecting more than a contact edge (23) with the other half member (40) and standing up at the opposite sides of each of corrugated tubes (80A, 80B), each pair of temporary fixing ribs (26A, 26B) are shaped to be insertable into grooves (81A, 81B) of the corresponding corrugated tube (80A, 80B), and stand-up ends (27A, 27B) of the pair of temporary fixing ribs (26A, 26B) are bent to approach each other along the groove (81A, 81B) of the corrugated tube (80A, 80B).

39 Claims, 18 Drawing Sheets

PROTECTOR

BACKGROUND OF THE INVENTION

1. Field of the Invention

The invention relates to a protector for holding a corrugated tube.

2. Description of the Related Art

Japanese Unexamined Patent Publication No. H09-294320 discloses a protector for protecting corrugated tubes. The protector is mounted on a branched part of a bundle of wires and is substantially T-shaped with a main line portion covering a main-line of the wires and a branch covering a branch line of the wires. The protector has first and second half members connected by a hinge and is mounted while holding the corrugated tubes covering the wires between the half members. The corrugated tubes are held to project from ends of the protector while covering the wires. Thus, the wires are not damaged by contact with the end edges of the protector.

The half members first are held in an open state for mounting the protector. The first half member then is placed on the main-line corrugated tube that is mounted on the main-line of the wires. At this time, the first half member is positioned so that opposite ends of the main-line corrugated tube project from the opposite end edges of the main line portion. The branch-line corrugated tube then is mounted on the branch line of the wires drawn out from the main-line corrugated tube and the branch of the first half member is placed on this branch-line corrugated tube. The second half member is put on the first half member while the branch-line corrugated tube and the main-line corrugated tube are pressed by the hand to prevent displacement from the first half member and, consequently, the two half members are closed.

The need to press the main-line corrugated tube and the branch-line corrugated tube by hand to prevent displacements takes time and labor and therefore is inefficient.

Furthermore, the ribs need to be fit reliably into the grooves to mount the protector on the corrugated tubes. Thus, if corrugate tubes differ in diameter, protectors sized in conformity with the different diameters must be prepared, leading to increased cost.

Japanese Unexamined Patent Publication No. H08-145241 discloses another protector for fixing a bundle of wires to an object such as a body panel. This protector has first and second half members to be engaged with corrugated tubes covering the bundle of wires while holding them therebetween. An engaging leg projects from the outer surface of the first half member and is shaped for insertion into the mount hole of the body panel. The engaging leg includes two resilient pieces that deform during insertion into the mount hole. The resilient pieces restore resiliently to engage the edge of the mount hole to be retained in the mount hole upon completing the inserting operation.

The above-described protector is mounted on the body panel in a specified orientation. Accordingly, a wire laying direction is determined upon mounting the protector on the body panel, and many types of protectors have to be prepared to lay bundles of wires in specified directions, thereby presenting a problem of low versatility.

The invention was developed in view of the above situation and an object thereof is to provide a protector for improving mounting efficiency.

SUMMARY OF THE INVENTION

The invention relates to a protector with first and second split members that can be assembled into a substantially tubular shape so that at least one corrugated tube that covers wires can be held between the split members. At least one temporary fixing rib projects beyond a contact edge with the other split member and stands up adjacent to the corrugated tube for temporarily fixing the corrugated tube. The temporary fixing rib is shaped to be insertable into a groove of the corrugated tube.

Two temporary fixing ribs preferably are provided and have ends bent to approach each other along the groove of the corrugated tube.

The corrugated tube can be mounted between the pair of temporary fitting ribs to prevent lateral displacement of the corrugated tube. Longitudinal displacement of the corrugated tube also is prevented by inserting the temporary fitting ribs into the groove. Upward movements of the corrugated tube from the member are prevented by the stand-up ends bent to approach each other. Thus, the corrugated tube need not be pressed by the hand to prevent displacements relative to the half member, and hence the efficiency of the mounting operation of the protector can be improved.

One or more supporting shafts may be provided near the base ends of the temporary fixing ribs and substantially opposite to the stand-up ends. The support shafts have axial lines that extend in the longitudinal direction of the split members, and the temporary fixing ribs may be continuous with a peripheral wall of the half member via the supporting shafts. Thus, the temporary fitting ribs are resiliently deformable in opening and closing directions about axial lines of the supporting shafts. The temporary fitting ribs are deformed resiliently out if the corrugated tube is inserted between the temporary fitting ribs, and the corrugated tube is held by resilient restoring forces of the temporary fitting ribs upon being mounted at a specified position.

Windows may be formed at positions of the peripheral walls of the split members corresponding to the temporary fixing ribs for permitting the penetration of the temporary fixing ribs through peripheral walls. Thus, the outwardly deformed temporary fitting ribs can be inserted into the windows if a corrugated tube with a large diameter deforms the temporary fitting ribs outwardly. Hence, corrugated tubes with different diameters can be mounted between the temporary fitting ribs, thereby improving mounting efficiency.

The split members may include one or more deformation restricting portions at sides of the split members outward of the temporary fixing ribs to prevent radially outward displacements of the temporary fixing ribs beyond a specified degree. Thus, the disengagement of the temporary fitting ribs and the corrugated tube can be prevented.

The two split members may be connected by at least one hinge, and a resilient connecting piece for biasing the split half members in opening directions may be provided between the split members. Accordingly, the efficiency of the mounting the protector can be improved since the split members are held in the open state even without being pressed by the hand.

At least one wire protrusion preventing portion may project more than the contact edge of one split member in an assembling direction with the other split member for preventing protrusion of wires exposed from the corrugated tube to the outside of the split half member. Accordingly, the efficiency of the mounting operation of the protector can be improved since the wires are held and will not protrude from the one split member.

At least one fitting recess shaped to engage the wire protrusion preventing portion may be formed at a part of a peripheral wall of the other split member corresponding to the wire protrusion preventing portion. Accordingly, the wire protrusion preventing portion can fit into the fitting recess without projecting inward or outward from the peripheral wall of the split member.

The pair of split members may be mounted on a branched part of the wires and each split member may be an integral or unitary assembly of at least one main line portion to be mounted on a main line of the wires and at least one branch to be mounted on a branch line of the wires.

Opposite end portions of the main line portion may serve as main-line tube holding portions for holding a main-line corrugated tube at least partly covering the main line of the wires, and an end portion of the branch line substantially opposite to a side connected with the main line portion may serve as a branch tube holding portion for holding a branch-line corrugated tube covering the branch line of the wires.

Each of the main-line tube holding portions and the branch may have temporary fixing ribs. Accordingly, efficiency is better than a case where all of the corrugated tubes are pressed by the hand to prevent displacements.

The split members may include locks for holding the split members in an assembled state. The locks may be provided on the main-line tube holding portions and/or the branch.

The locks may be at positions closer to the distal ends of the main-line tube holding portions and/or the branch than the temporary fixing ribs.

At least one rib preferably is provided on the inner circumferential surface of the split member with the temporary fixing rib and may be insertable into the groove of the corrugated tube, in addition to the temporary fixing ribs. Accordingly, mounting efficiency is improved.

The first split member may include one or more first ribs shaped to be adjacent a side of the corrugated tube and insertable into at least one groove of the corrugated tube. The second split member may include at least one second rib shaped for insertion into at least one groove of the corrugated tube. The first rib is resiliently displaceable towards and away from the corrugated tube while the second rib is resiliently displaceable in inward and outward directions of the split members. Accordingly, the protector can be mounted on many types of corrugated tubes with different diameters.

Two first ribs preferably are provided at opposite sides of the corrugated tube and are insertable into a groove of the corrugated tube. The first ribs are resiliently displaceable towards and away from each other.

The second rib may be on a resilient portion on the second split member and may be resiliently displaceably in inward and outward directions.

The second split member may have circumferentially extending slits, and the resilient portion may be between the slits. The resilient portion may project inwardly of the second split member and the second rib may be at the projecting end thereof.

A plurality of second ribs may be provided, an opening may be formed in the resilient portion between the plurality of second ribs, and the thickness of the resilient portion in inward and outward directions preferably is substantially constant in the entirety of the resilient portion. Thus, the rigidity of a part of the resilient portion where the second ribs are provided is not excessively high and the resilient portion can easily conform to the outer shape of the corrugated tube.

An inclined surface substantially in conformity with the outer circumferential surface of a protrusion of the corrugated tube may be formed on the resilient portion between the second ribs.

The first ribs may project beyond a contact edge of the first split member with the second split member in their assembling direction.

The first ribs may be substantially continuous with the first split member via a support with an axial line that extends substantially in the longitudinal direction of the split member.

At least one elongated projection may be provided adjacent to the first rib and may be insertable into at least one groove of the corrugated tube.

The protector may be configured to fix a bundle of wires to an object. More particularly the protector may include an engaging part separate from the split members and mountable on a mounting portion of the split members for engagement in a fixing hole in the object. The engaging part preferably includes at least one leg shaped for insertion into the fixing hole, at least one resilient engaging piece engageable with the fixing hole to retain the leg when the leg is inserted to a specified position, and a bulging plate provided near the rear end of the leg in an inserting direction into the fixing hole and bulging out in a direction at an angle to the inserting direction. The mounting portion includes at least one guide plate formed with a mount groove for receiving the leg and at least one resilient plate spaced from the guide plate to define a space for holding the bulging plate. The resilient plate is resiliently displaceable in a direction to extend the distance to the guide plate. A surface of the resilient plate facing the guide plate and a surface of the bulging plate opposite to a side where the leg is provided have engaging portions that are engageable with each other. The leg is shaped for insertion into the mount groove in mounting postures of the engaging part angularly displaced about the axial line of the leg, and the engaging portions are shaped to prevent withdrawal of the bulging plate from an accommodating portion formed between the guide plate and the resilient plate upon insertion of the bulging plate into the accommodating portion, regardless of the mounting posture in which the engaging part is set. Accordingly, the bulging plate is held between the guide plate and the resilient plate and displacements in a withdrawing direction are prevented. Thus, the engaging part is held on the mounting portion.

The engaging part is mountable on the mounting portion in any of the angularly displaced mounting postures. Thus, the orientation of the engaging part can be arbitrarily selected to improve versatility for fixing a bundle of wires to an object such as a body panel.

The bulging plate may be substantially square.

An inserting portion of the leg to be inserted into the mount groove may have a substantially square cross-sectional shape in a direction substantially orthogonal to the axial line of the leg.

The engaging portions may be a projection on the resilient plate and a recess formed in the bulging plate.

The mounting portion may be on each of the split members. Thus, the engaging part can be mounted on a selected one of the split members.

The leg may include at least one projection that cooperates with the bulging plate to sandwich the guide plate when the bulging plate is inserted into the accommodating portion. Thus, relative shaking movements of the engaging part and the mounting portion can be suppressed.

A plurality of projections may be arranged at positions to sandwich the guide plate in cooperation with the bulging plate in any of the mounting postures of the engaging part. Thus, relative shaking movements of the engaging part and the mounting portion can be suppressed regardless of the posture in which the engaging part is mounted.

The resilient plate may extend in the circumferential surface of the split member at an inner position of the split member and may be supported at both ends. Accordingly, the projecting distance of the engaging part from the split member is reduced with the engaging part mounted on the mounting portion as compared to a case where the resilient plate is at the outer side of the split member. Therefore, the protector can be miniaturized by that much.

Opposite ends of each split member may serve as tube engaging portions engageable with the corrugated tube, and the mounting portion may be provided between the tube engaging portions in the split member. Thus, miniaturization of the protector is achieved without reducing a wire accommodation rate since the mounting portion is in a part of each split member where the corrugated tube is not accommodated.

The split members may be mounted on a branched part of the wires and each split member may be an integral or unitary assembly of at least one main line portion to be mounted on at least one main line of the wires and at least one branch to be mounted on at least one branch line of the wires. Thus, the protector can be used merely to keep a wire branching direction without the engaging part being mounted, wherefore versatility can be improved.

The mounting portion may be constructed so that the engaging part is mountable thereon by being inserted in a direction substantially parallel to the longitudinal direction of the branch, and a surface of the resilient plate where the projection is provided and the outer surface of the branch may be substantially flush with each other. Thus, the engaging part can be positioned easily by sliding the bulging plate on the outer surface of the branch.

A slanted surface for the leg may be formed at an open end of the mount groove and may be inclined to widen the width of the mount groove towards the front in the inserting direction of the leg. Thus, the leg is inserted smoothly into the mount groove and the engaging part can be mounted easily.

A slanted surface for bulging plate may be formed at an open end of the accommodating portion and is inclined to widen the width of the accommodating portion toward the front side in the inserting direction of the bulging plate. Thus, the bulging plate is inserted smoothly into the accommodating portion and the engaging part can be mounted easily.

The front surface of the projection in the inserting direction of the engaging part may be formed into a riding surface inclined so that the projecting distance of the projection gradually increases toward the back side in the inserting direction. Thus, the bulging plate moves onto the riding surface without getting caught by the projection and is inserted smoothly into the accommodating portion. As a result, the engaging part can be mounted easily.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A protector in accordance with the invention is identified by the numeral 10 in FIGS. 1 to 8. The protector 10 according to this embodiment is to be mounted at a branched part of an unillustrated wire bundle for holding main-line corrugated tubes 80A that protect and cover a main line of wires and a branch-line corrugated tube 80B that protects and covers a branch line of wires. The main-line corrugated tubes 80A and the branch-line corrugated tube 80B have bellows or corrugated shapes with a series of alternating projections and recesses. In this embodiment, the branch-line corrugated tube 80B has a smaller diameter than the main-line corrugated tubes 80A.

Figure 2:
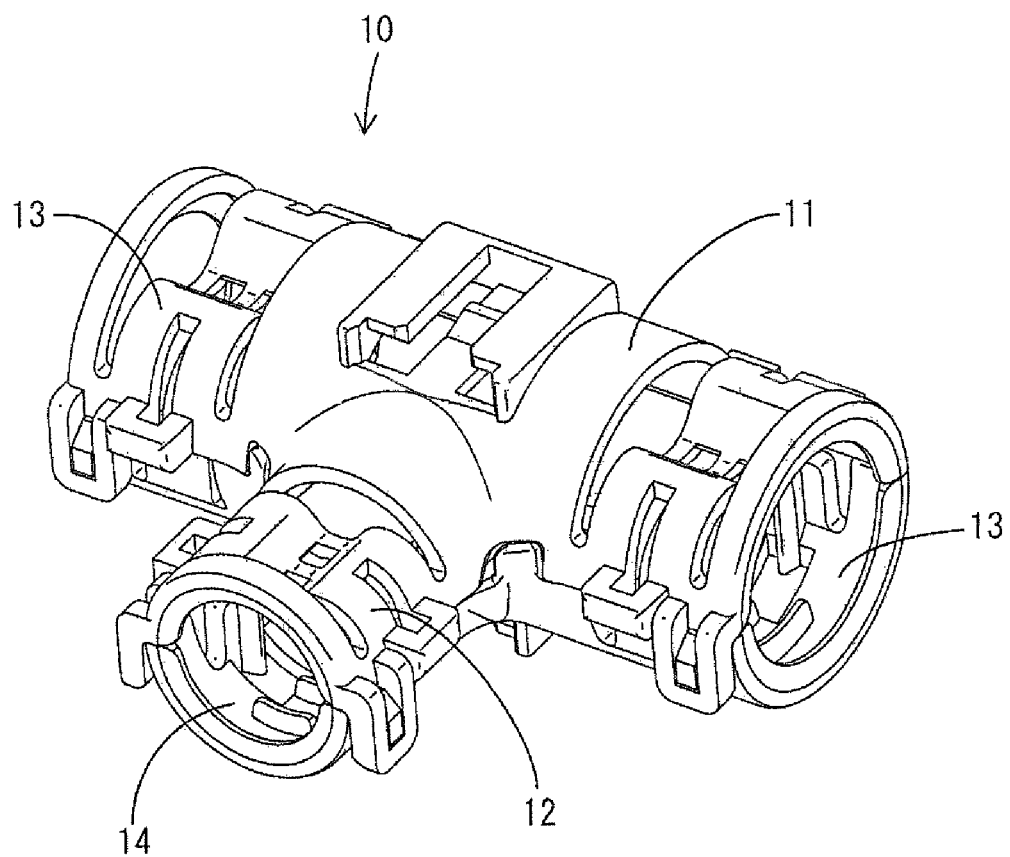
FIG. 2 is an external perspective view of the protector.

The protector 10 is made unitarily e.g. of synthetic resin and has a substantially cylindrical main line portion 11 for holding the main-line corrugated tubes 80A and a substantially cylindrical branch 12 for holding the branch-line corrugated tube 80B, as shown in FIG. 2. The protector 10 is substantially T-shaped so that the branch 12 is aligned substantially at right angles to the main line portion 11, and the main line portion 11 and the branch 12 are connected so that the wires can be introduced from the main line portion 11 to the branch 12. It should be understood that configurations different from a T-configuration, such as a Y- or X- or star-like configuration having one or more branches are possible.

Figure 1:
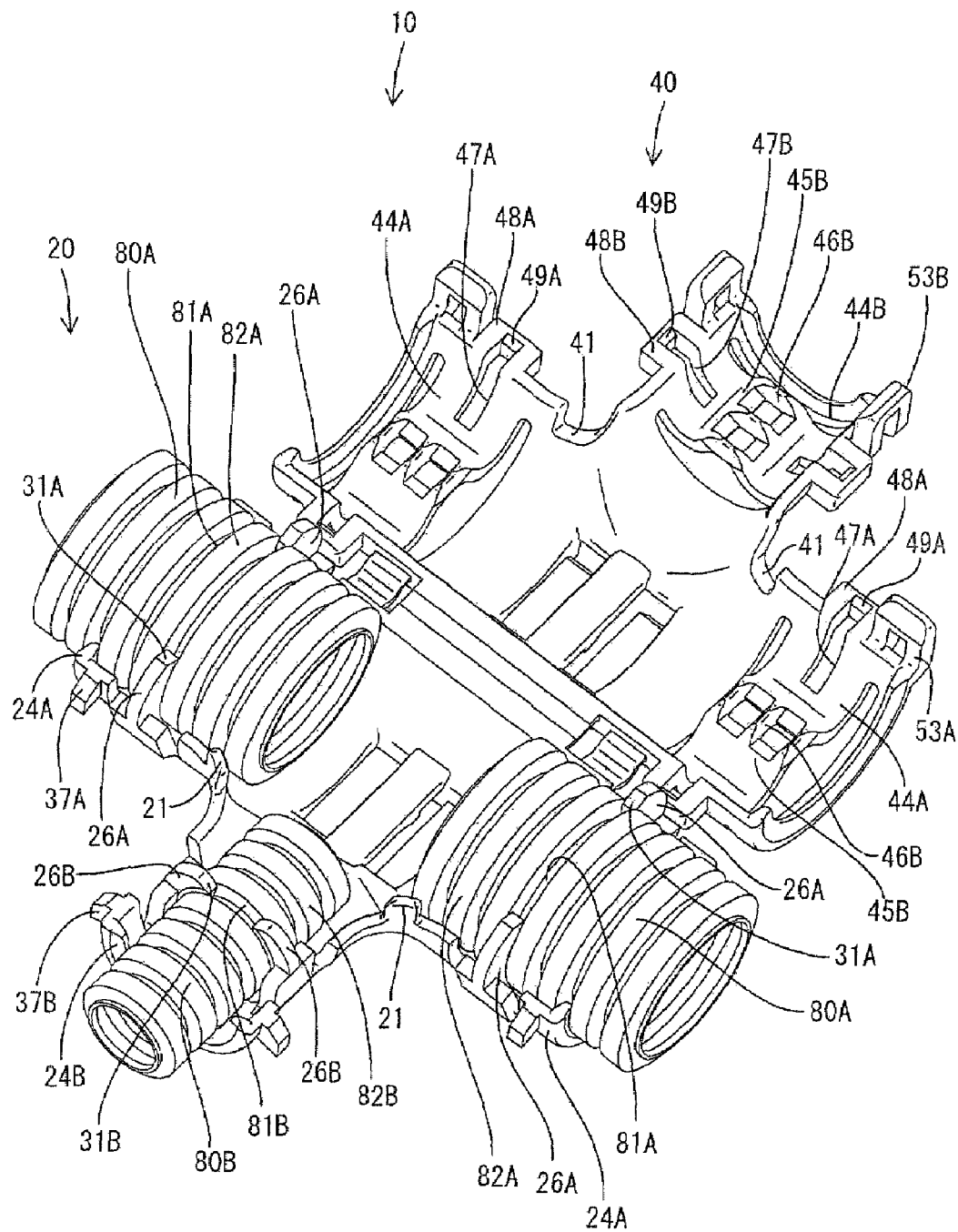
FIG. 1 is an external perspective view showing corrugated tubes held on a first half member in a protector of one embodiment.

The inner diameter and configuration of the main line portion 11 corresponds to the outer diameter and configuration of the main-line corrugated tubes 80A, and the inner diameter and configuration of the branch 12 preferably exceeds the outer diameter of the branch-line corrugated tube 80B (see FIG. 1).

Main-line tube holding portions 13 are defined at opposite longitudinal ends of the main line portion 11 for holding the main-line corrugated tubes 80A, and a branch-line tube holding portion 14 is defined at the longitudinal end of the branch 12 remote from the main line portion 11 for holding the branch-line corrugated tube 80B.

The main-line corrugated tubes 80A and the branch-line corrugated tube 80B are held by the main-line tube holding portions 13 and the branch-line tube holding portion 14 so that longitudinal ends thereof project out from the protector 10. Thus, parts of the main line and branch line of wires are covered respectively by the main-line corrugated tubes 80A or the branch-line corrugated tube 80B at the end edges of the protector 10 so that the wires cannot be damaged by contact with the end edges of the protector 10.

The protector 10 has first and second half members 20 and 40 connected by a hinge 60, and the main-line corrugated tubes 80A and the branch-line corrugated tube 80B are held between the two half members 20, 40. Sides of the half members 20, 40 accommodating the wires are referred to herein as inner sides and the opposite sides are referred to as outer sides.

Figure 3:
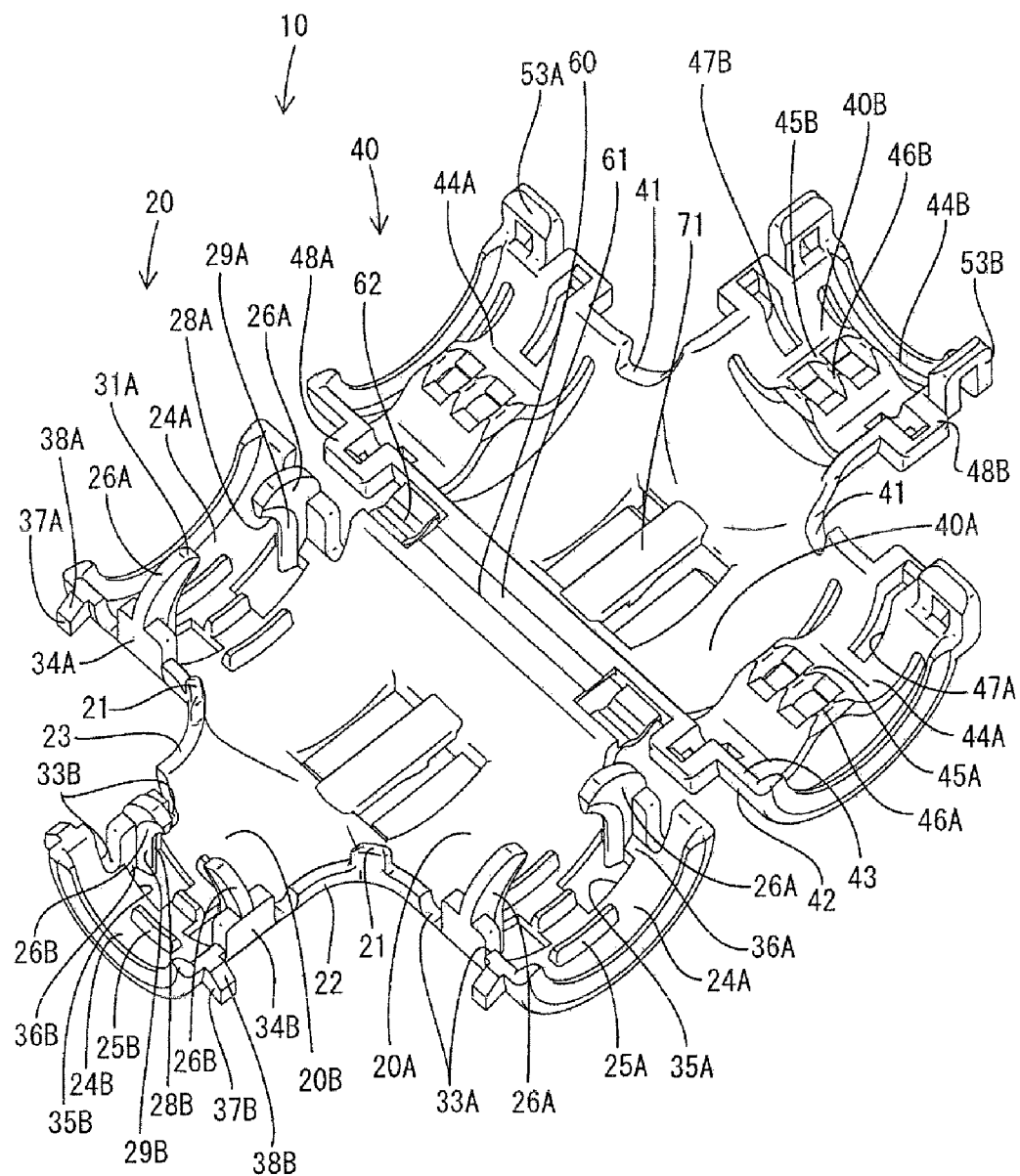
FIG. 3 is an external perspective view showing a state where two half members are in an open state.

As shown in FIG. 3, the first and second half members 20, 40 have substantially identical T-shapes, with first and second main line portions 20A and 40A forming part of the main line portion 11 and first and second branches 20B and 40B forming part of the branch 12. The first and second main line portions 20A and 40A and the first and second branches 20B and 40B have substantially semicylindrical shapes. However, the first and second half members 20, 40 may be shaped differently from each other (e.g. one part covering more than half and the other less than half the entire circumference), and there may be additional elements interposed therebetween.

Wire protrusion preventing portions 21 are formed on a first peripheral wall 22 of the first half member 20 at the corners between the first main line portion 20A and the first branch 20B. The wire protrusion preventing portions 21 project in an assembling direction with the second half member 40 from a first contact edge 23 that mates with the second half member 40. The thickness of the wire protrusion preventing portions 21 in inward and outward directions is equal to the thickness of the first peripheral wall 22, and the inner and outer surfaces thereof are substantially flush with those of the first peripheral wall 22. The wire protrusion preventing portions 21 are substantially rectangular and are slightly longer in a width direction when the first peripheral wall 22 is seen in an inward or outward direction. Surfaces of the wire protrusion preventing portions 21 facing the first branch 20B are substantially parallel along the longitudinal direction of the first branch 20B and extend substantially along a branching direction of the wires (see FIG. 4).

The main-line tube holding portions 13 include first main-line tube holders 24A in the first half member 20 and the branch-line tube holding portion 14 includes a first branch-line tube holder 24B in the first half member 20. The first main-line tube holders 24A and the first branch-line tube holder 24B each have ribs 25A, 25B that fit into grooves 81A, 81B of the main-line corrugated tubes 80A and the branch-line corrugated tube 80B. The ribs 25A, 25B extend circumferentially and are arranged at substantially circumferentially middle positions of the first main-line tube holders 24A and the first branch-line tube holder 24B. Each of the first main-line tube holders 24A and the first branch-line tube holder 24B has three ribs at intervals substantially corresponding to those of the grooves 81A, 81B of the corrugated tubes 80A, 80B in the longitudinal direction. Inner projecting edges of the ribs 25A, 25B have arcuate shapes to extend along the bottom surfaces of the grooves 81A, 81B of the respective corrugated tubes 80, and the thicknesses of the ribs 25A, 25B decrease gradually towards the inner edges in conformity with the inclinations of the side surfaces of the grooves 81A, 81B.

Temporary fixing ribs 26A, 26B are formed respectively on the first main-line tube holders 24A and the first branch-line tube holder 24B and project beyond the contact edge with the second half member 40 for disposition on opposite sides of the corrugated tube 80A, 80B. The temporary fixing ribs 26A, 26B are at opposite ends of the middle of the three ribs 25A, 25B.

The main-line temporary fixing ribs 26A on the first main-line tube holders 24A and the branch-line temporary fixing ribs 26B on the first branch-line tube holder 24B have similar shapes, but the branch-line temporary fixing ribs 26B preferably are smaller than the main-line temporary fixing ribs 26A.

The temporary fixing ribs 26A, 26B are shaped to fit into the grooves 81A, 81B of the corrugated tubes 80A, 80B, and project towards inner sides from the first peripheral wall 22 of the first main-line tube holder 24A and the first branch-line tube holder 24B. The respective temporary fixing ribs 26A, 26B are plates with opposite surfaces that extend substantially orthogonal to the longitudinal directions of the corrugated tubes 80A, 80B.

Figure 6:
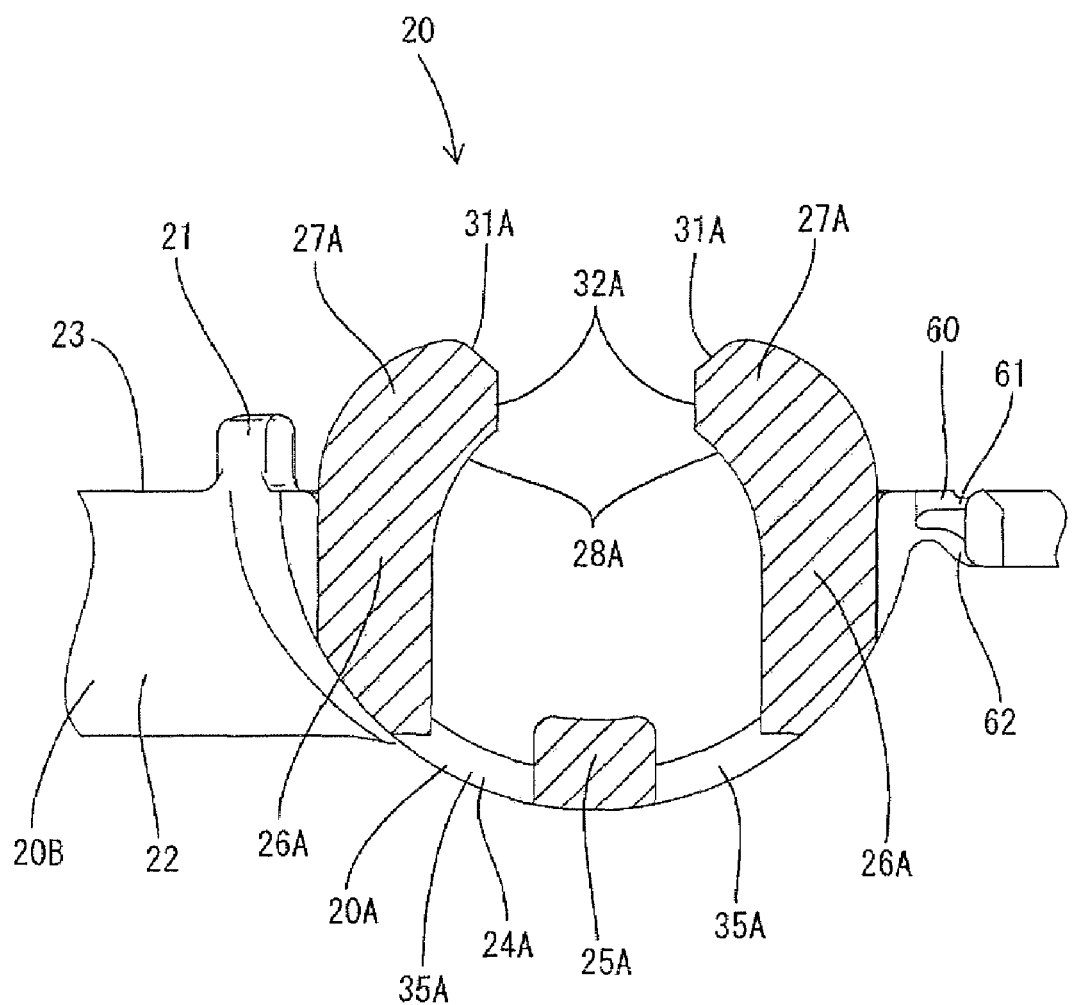
FIG. 6 is a partial enlarged section showing the temporary fixing ribs.

As shown in FIG. 6, stand-up ends 27A, 27B of the temporary fixing ribs 26A, 26B are inclined to approach each other along the grooves 81A, 81B of the corrugated tube 80. More particularly, facing edges 28A, 28B of the temporary fixing ribs 26A, 26B are substantially straight from the base ends of the temporary fixing ribs 26A, 26B to intermediate positions in the standing direction, but upper parts of the facing edges 28A, 28B have concave arcuate shapes to approach each other. In a state where the corrugated tubes 80A, 80B are not held, the straight parts of the facing end edges 28A, 28B of the temporary fixing ribs 26A, 26B are substantially parallel to each other.

Guiding slants 31A, 31B are formed at upper parts of the stand-up ends 27A, 27B that face each other and are inclined with respect to an engagement direction with ribs of the corrugate tube 80 in approaching directions from the upper side towards the lower side. Introducing portions 32A, 32B are defined radially inward from the guiding slants 31A, 31B and are substantially parallel to each other before the corrugated tube 80 is mounted.

Chamfers 29A, 29B extend along the facing edges 28A, 28B of the temporary fixing ribs 26A, 26B so that the thicknesses thereof decrease gradually towards the facing edges 28A, 28B in conformity with the shapes of the grooves 81A, 81B of the corrugated tubes 80A, 80B.

Slits 33A, 33B are formed in the first peripheral wall 22 of the first half member 20 at opposite sides of each temporary fixing rib 26A, 26B, as shown in FIG. 3. The slits 33A, 33B are long and narrow and extend in the circumferential direction from the first contact edge 23. Integral walls 34A, 34B are defined on parts of the first peripheral wall 22 between the slits 33A, 33B and are formed unitarily with the outer extremes of the temporary fixing ribs 26A, 26B. The upper edges of the integral walls 34A, 34B are at substantially the same height position as the first contact edge 23 (see FIG. 5).

Figure 4:
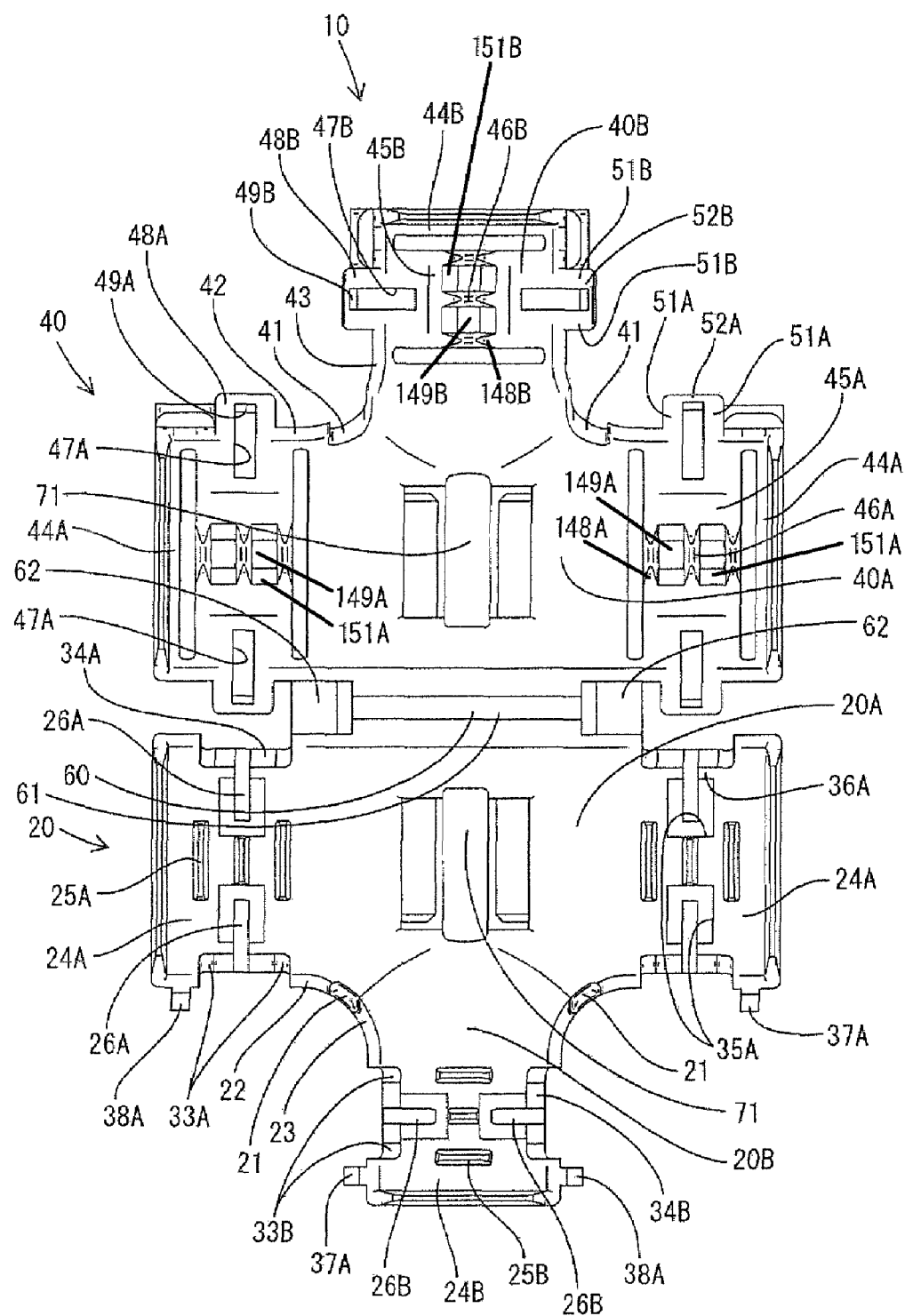
FIG. 4 is a plan view showing the two half members open.
Figure 5:
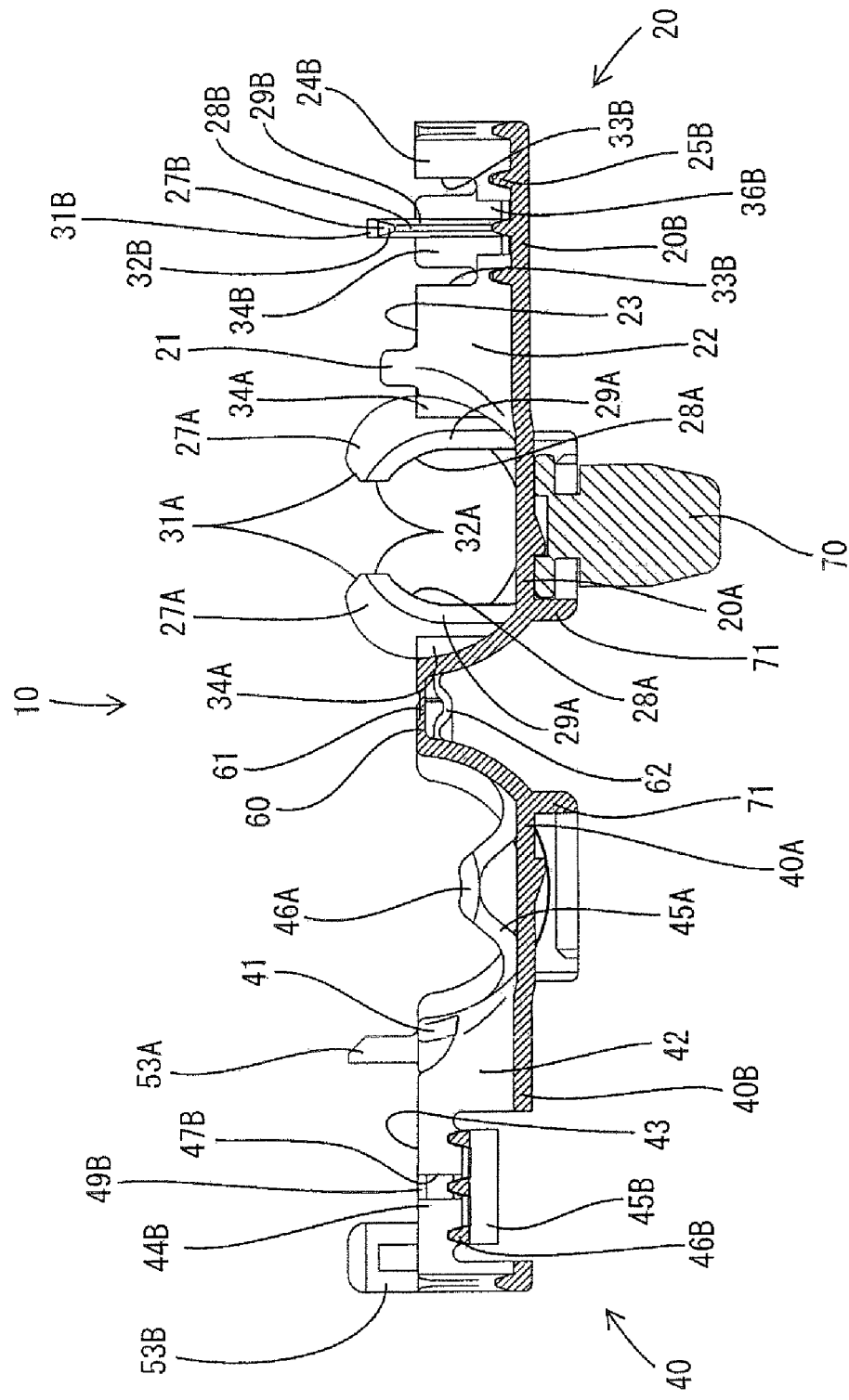
FIG. 5 is a section showing the two half members open.

Openings 35A, 35B penetrate the first peripheral wall 22 near the base ends of the respective temporary fixing ribs 26A, 26B and in parts between the middle of the three ribs 25A, 25B and the respective temporary fixing ribs 26A, 26B (see FIGS. 3 and 4). The openings 35A, 35B have substantially rectangular shapes slightly longer in the circumferential direction. Shorter sides of the respective openings 35A, 35B are slightly shorter than the widths of the integral walls 34A, 34B. Further, the chamfers 29A, 29B of the temporary fixing ribs 26A, 26B project into the openings 35A, 35B (see FIG. 3).

Supporting shafts 36A, 36B extend in the longitudinal directions of the first main line portion 20A and the first branch line portion 20B along parts of the first peripheral wall 22 between the openings 35A, 35B and the integral walls 34A, 34B (see FIG. 4). The supporting shafts 36A, 36B can be twisted about axial lines extending in the longitudinal directions of the first main line portion 20A and the first branch line portion 20B. The supporting shafts 36A, 36B join the temporary fixing ribs 26A, 26B and the integral walls 34A, 34B with the other parts of the first peripheral wall 22 so that the temporary fixing ribs 26A, 26B are displaceable in and out about the axial lines of the supporting shafts 36A, 36B.

The branch-line temporary fixing ribs 26B are dimensioned to fit into grooves 81B of the branch-line corrugated tube 80B in a natural state free from resilient deformations. The main-line temporary fixing ribs 26A are dimensioned to fit into the groove 81A of the main-line corrugated tube 80A while being deformed outwardly.

The first half member 20 is mountable on corrugated tubes with different diameters in the resilient displaceable ranges of the main-line and branch-line temporary fixing ribs 26A, 26B. Specifically, the first half member 20 is mountable on corrugated tubes with different diameters in the range from corrugated tubes with a diameter substantially equal to the spacing between the facing edges 28A, 28B when the main-line and branch-line temporary fixing ribs 26A, 26B are in their natural states without being resiliently displaced, to corrugated tubes with a diameter equal to or slightly smaller than the inner diameter of the first main line portion 20A or the first branch portion 20B.

The branch-line corrugated tube 80B has the minimum diameter for the branch-line tube engaging portion 14, and the branch-line first ribs 26B are fit into the groove 81B of the branch corrugated tube 80B without being displaced. On the other hand, the main-line corrugated tubes 80A have the maximum diameter, and the main-line first ribs 26A are fit into the grooves 81A of the main-line corrugated tubes 80A while being deformed outwardly.

Lock projections 37A, 37B project out from the first peripheral wall 22 of the first main-line tube holders 24A and the first branch-line tube holder 24B of the first half member 20. The respective lock projections 37A, 37B are closer to the distal ends than the respective temporary fixing ribs 26A, 26B and at specified distances to the end edges of the first main line portion 20A and the first branch line portion 20B. Inclined surfaces 38A, 38B are defined on the respective lock projections 37A, 37B at the side of the first contact edge 23 and project gradually less in the assembling direction.

Fitting recesses 41 are formed in parts of the second half member 40 at corners between the second main line portion 40A and the second branch 40B for receiving the respective wire protrusion preventing portions 21. The fitting recesses 41 are formed by cuts in a second peripheral wall 42 of the second half member 40 from a second contact edge 43 with the first half member 20 in a direction opposite to the assembling direction with the first half member 20. The shapes of the fitting recesses 41 conform to outer shapes of the wire protrusion preventing portions 25A, 25B.

The main-line tube holding portion 13 includes second main-line tube holders 44A and the branch-line tube holding portion 14 includes a second branch-line tube holder 44B. The second main-line tube holders 44A and the second branch-line tube holder 44B are provided respectively with resilient pressing portions 45A, 45B for pressing the main-line corrugated tubes 80A and the branch-line corrugated tube 80B. Each resilient pressing portion 45A, 45B is defined between a pair of circumferentially extending slits 146A, 146B. The slits 146A, 146B in each pair are arranged at the sides of the corresponding three elongated projections 25A, 25B on the first half member 20. Ends of the pressing portions 45A, 45B are supported at the opposite circumferential ends of the second peripheral wall 42 and are resiliently deformable in and out on the second peripheral wall 42. Similar to the first half member 20, the pressing portions 45A, 45B have ribs 46A, 46B that fit into the grooves 81A, 81B of the corrugated tubes 80A, 80B.

Figure 7:
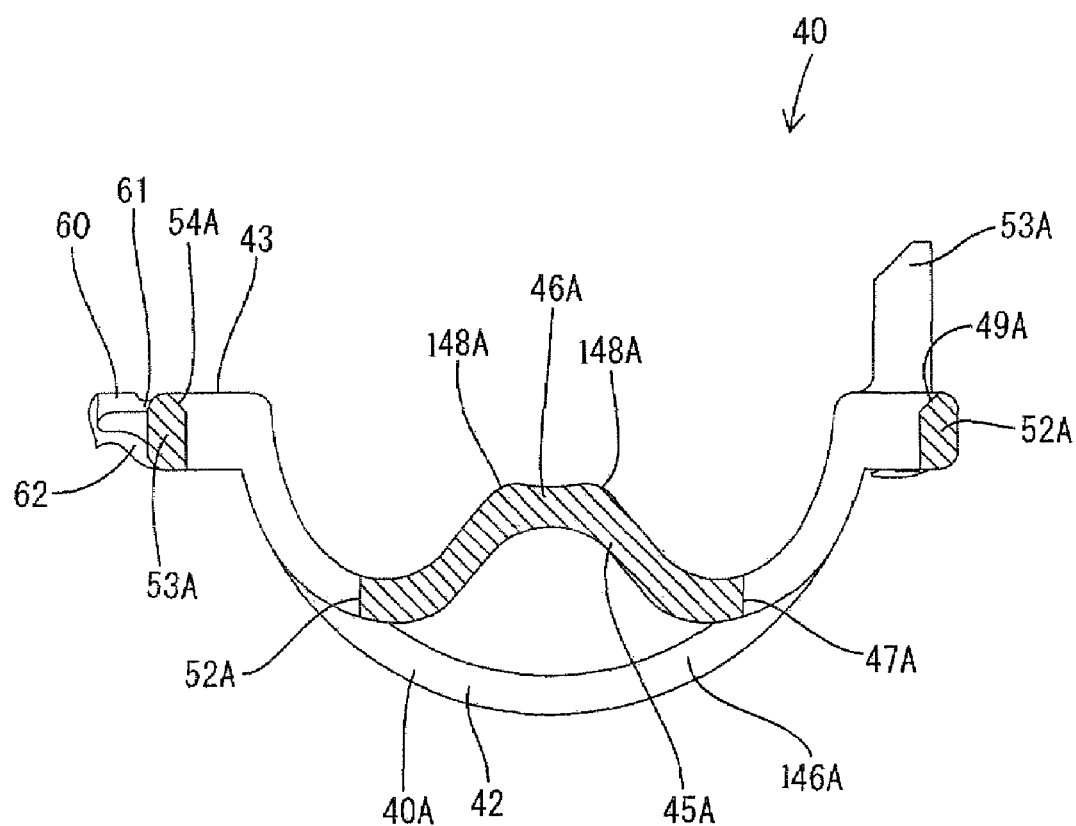
FIG. 7 is a partial enlarged section showing a resilient portion.
Figure 8:
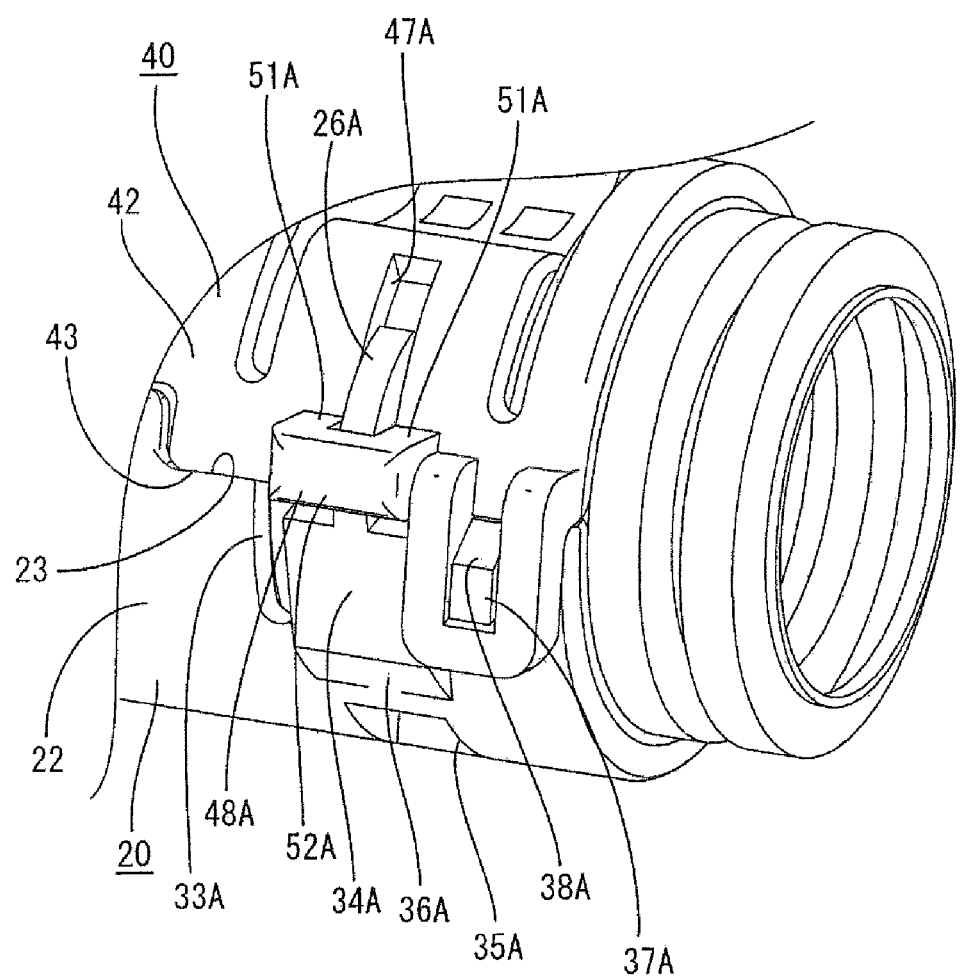
FIG. 8 is a partial enlarged external perspective view showing a state where the temporary fixing rib is deformed outwardly.
Figure 9:
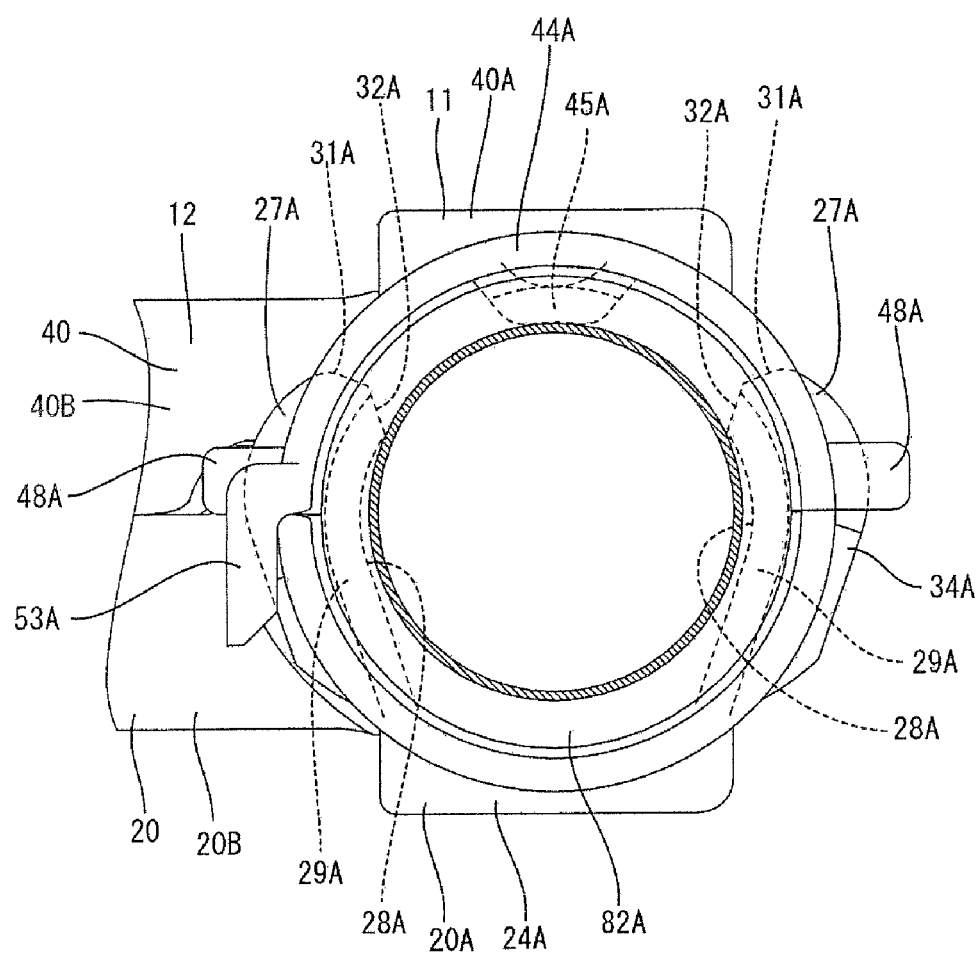
FIG. 9 is a partial enlarged section showing a state where the corrugated tube is held.

The resilient pressing portions 45A, 45B are substantially rectangular plates that are longer in the circumferential directions of the second main line portion 40A and the second branch 40B, and intermediate parts thereof in lengthwise directions are curved to project in (see FIG. 7). The thicknesses of the pressing portions 45A, 45B in inward and outward directions substantially equal the thickness of the second peripheral wall 42, and the overall shapes of the pressing portions 45A, 45B are kept without being deformed.

The ribs 46A, 46B are provided at inward-most projecting parts of the respective pressing portions 45A, 45B and at longitudinal middle parts of the pressing portions 45A, 45B (see FIGS. 4 and 7). The ribs 46A, 46B are at positions corresponding to the ribs 25A, 25B on the first half member 20 and are shaped for insertion into the grooves 81A, 81B of the corrugated tubes.

The ribs 46A, 46B extend substantially the same distance in the longitudinal directions of the pressing portions 45A, 45B, and inclined portions 148A, 148B are defined at the opposite longitudinal ends thereof, as shown in FIGS. 4 and 7. The inclined portions 148A, 148B are inclined to approach each other towards the projecting inner ends. The widths of the second ribs 46A, 46B in shorter-side directions gradually decrease towards the projecting ends to conform to the inclinations of the side surfaces of the grooves 81A, 81B of the respective corrugated tubes 80A, 80B. The inner projecting end edges of the respective ribs 46A, 46B are arcuate to extend at least partly along the grooves 81A, 81B of the respective corrugated tubes 80A, 80B.

Substantially rectangular openings 149A, 149B are formed between the ribs 46A, 46B of the respective resilient portions 45A, 45B. The openings 149A, 149B are slightly longer in the longitudinal directions of the ribs 46A, 46B and are formed in the entire parts of the ribs 46A, 46B adjacent to each other except the inclined portions 148A, 148B. The openings 149A, 149B reduce the rigidity of the parts of the resilient pressing portions 45A, 45B where the ribs 46A, 46B are provided. Therefore the pressing portions 45A, 45B can conform easily to the outer shapes of the corrugated tubes.

Figure 11:
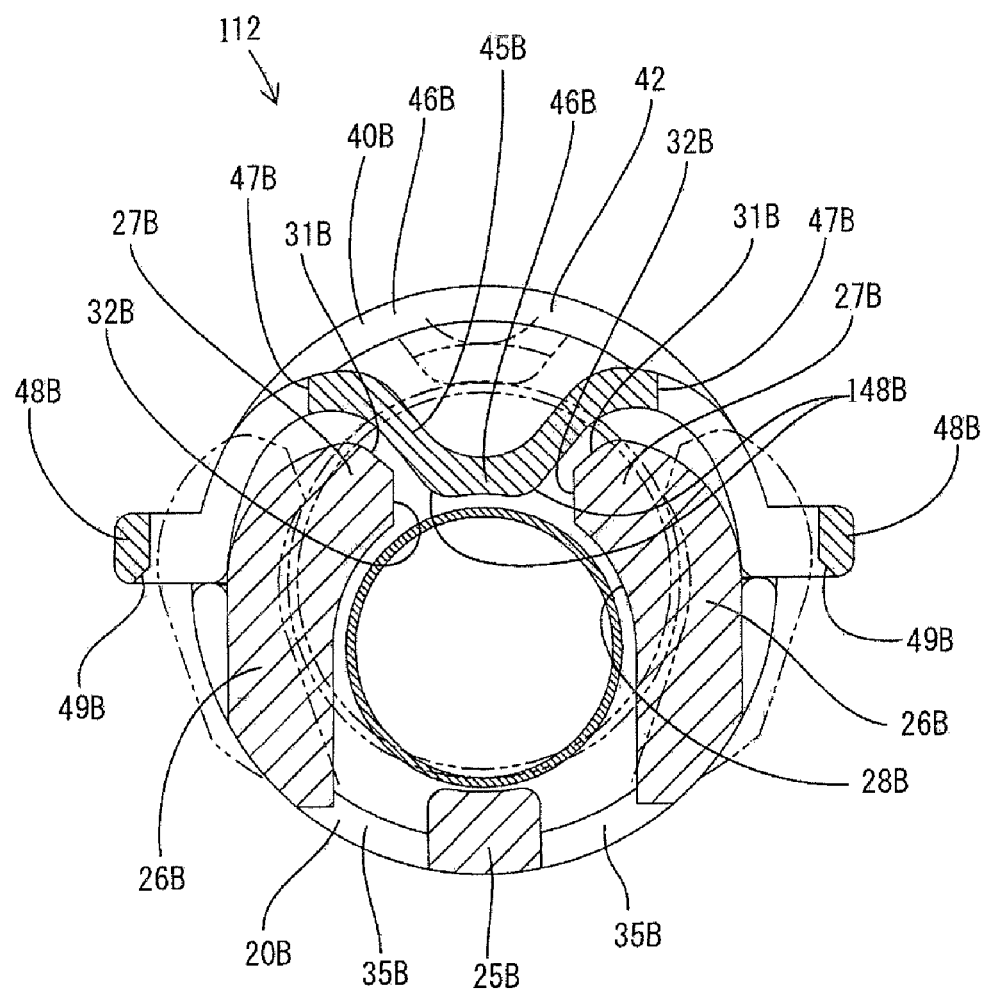
FIG. 11 is a partial enlarged section showing a state where the first ribs and a second rib are resiliently displaced.

Inclined surfaces 151A, 151B are formed between the adjacent ribs 46A, 46B of the resilient pressing portions 45A, 45B and conform with the outer circumferences of projections 82A, 82B of the corrugated tubes (see FIG. 11). The inclined surfaces 151A, 151B are near the opposite longitudinal ends of the peripheral edges of the respective openings 149A, 149B, i.e. at parts of the ribs 46A, 46B near the inclined portions 148A, 148B, and incline out from positions substantially aligned with the opposite longitudinal ends of the ribs 46A, 46B to the opening edges of the openings 149A, 149B.

The ribs 46A, 46B of the resilient pressing portions 45A, 45B are insertable into the grooves 81A, 81B of corrugated tubes with different diameters in the resilient displaceable ranges of the pressing portions 45A, 45B. Specifically, the ribs 46A, 46B enter the grooves of the corrugated tubes with the minimum diameter without the pressing portions 45A, 45B being displaced, whereas the ribs 46A, 46B enter the grooves of corrugated tubes with the maximum diameter with the pressing portions 45A, 45B displaced outwardly.

The branch-line ribs 46B engage the groove 81B of the branch-line corrugated tube 80B in a natural state where the resilient pressing portions 45B are not deformed and the main-line temporary fixing ribs 26A engage the grooves 81A of the main-line corrugated tube 80A in a state where the pressing portions 45A are displaced outwardly.

Windows 47A, 47B penetrate the second peripheral wall 42 in the assembling direction with the first half member 20 and at locations for receiving the temporary fixing ribs 26A, 26B. The windows 47A, 47B are long and narrow in the circumferential direction of the second peripheral wall 42 and extend from the second contact edge 43. The shorter sides of the windows 47A, 47B are slightly longer than the thicknesses of the corresponding temporary fixing ribs 26A, 26B. The temporary fixing ribs 26A, 26B can be inserted through the corresponding windows 47A, 47B when the two half members 20, 40 are assembled. It should be noted that the resilient tube holders 44A, 44B are formed with the windows 47A, 47B to reduce rigidities in these parts so that the resilient tube holders 44A, 44B can be displaced easily.

Displacement restricting portions 48A, 48B are provided at positions on the second peripheral wall 42 corresponding to the respective windows 47A, 47B. The deformation restricting portions 48A, 48B cross over ends of the respective windows 47A, 47B towards the second contact edge 43, and project out from positions on the second peripheral wall 42 at the opposite sides of the windows 47A, 47B. Each deformation restricting portion 48A, 48B defines a substantially U-shape with two projections 51A, 51B at opposite sides of the corresponding window 47A, 47B and a connecting portion 52A, 52B connecting the projecting ends of the projections 51A, 51B.

Facing surfaces of the two projections 51A, 51B of each deformation restricting portion 48A, 48B are substantially flush with the opposite side surfaces of the corresponding window 47A, 47B. Further, surfaces of the deformation restricting portions 48A, 48B facing the first half member 20 are substantially flush with the second contact edge 43. Escaping surfaces 49A, 49B are formed at parts of surfaces of the connecting portions 52A, 52B near the second contact edge 43 and facing the windows 47A, 47B.

A force may be exerted on the temporary fixing ribs 26A, 26B in the longitudinal direction of the corrugated tube 80A, 80B if, for example, the corrugated tube 80A, 80B is pulled while the temporary fixing ribs 26A, 26B are inserted through the windows 47A, 47B. However, the temporary fixing ribs 26A, 26B are supported in substantially surface contact with the side surfaces of the windows 47A, 47B and with the projections 51A, 51B of the deformation restricting portions 48A, 48B. Therefore displacements of the temporary fixing ribs 26A, 26B in the longitudinal direction is reduced significantly. Further outward deformation of the temporary fixing ribs 26A, 26B is limited by the connecting portions 52A, 52B. In this way, the temporary fixing ribs 26A, 26B are not likely to disengage from the corrugated tube 80A, 80B and are not likely to be damaged by excessive outward deformation.

The second main-line tube holders 44A and the second branch-line tube holder 44B of the second half member 40 have lock pieces 53A, 53B disposed to engage the lock projections 37A, 37B of the first half member 20 to hold the half members 20, 40 assembled. The lock pieces 53A, 53B are closer to the distal ends than the respective deformation restricting portions 48A, 48B, and project out from the second peripheral wall 42 in the assembling direction with the first half member 20. The lock pieces 53A, 53B are adjacent to the deformation restricting portions 48A, 48B and are flush with end surfaces of the first main line portion 20A or the first branch 20B.

The hinge 60 is between the first and second main line portions 20A and 40A of the half members 20, 40 and is unitary with edges of the main line portions 20A, 40A at sides opposite the branches 20B, 40B. The hinge 60 is a flat plate long in the longitudinal direction of the main line portion 11, and has an inner surface flush with the first and second contact edges 23, 43 (see FIG. 5).

A bendable portion 61 is defined in an intermediate part of the hinge 60 in a shorter-side direction and is thinner or more easily bent than other parts. The bendable portion 61 extends along the longitudinal direction of the hinge 60, and the two half members 20, 40 are rotated between a closed state and an open state by bending the bendable portion 61.

Resilient connecting pieces 62 are connected with the first and second main line portions 20A, 40A at opposite ends of the hinge 60. The resilient connecting pieces 62 are rectangular plates longer in the shorter-side direction of the hinge 60, and connect positions of the first and second peripheral walls 22, 42 circumferentially displaced from the first and second contact edges 23, 24 by a specified distance. Thus, the resilient connecting pieces 62 are at positions circumferentially displaced from the hinge 60.

The resilient connecting pieces 62 are recessed outwardly in their longitudinal intermediate parts as compared to their opposite ends. With these recessed parts extended flat, the longer sides of the resilient connecting pieces 62 are longer than the shorter sides of the hinge 60.

The hinge 60 is deformed upon pivoting the first and second half members 20, 40 towards each other so that the bendable portion 61 projects out, and the resilient connecting pieces 62 elongate as the first and second peripheral walls 22, 42 move away therefrom. The resilient connecting pieces 62 are inwardly of the bendable portion 61 when the two half members 20, 40 are pivoted to specified positions. At this time, the resilient connecting pieces 62 have forces trying to return in shrinking directions, and these forces are produced at positions inwardly of the bendable portion 61 of the hinge 60. Thus the first and second half members 20, 40 are biased in closing directions.

On the other hand, the resilient connecting pieces 62 are outward of the bendable portion 61 when the bendable portion 61 of the hinge 60 is opened and the two half members 20, 40 are pivoted to specified positions. At this time, the resilient connecting pieces 62 have resilient restoring forces in the shrinking directions, and these forces are produced at positions outwardly of the bendable portion 61 of the hinge 60 so that the first and second half members 20, 40 are biased in opening directions.

The main-line corrugated tubes 80A and the branch-line corrugated tube 80B are fit on the wires e.g. by inserting over the respective wires through the longitudinal openings or through slits along the longitudinal direction thereof.

The two half members 20, 40 then are opened by about 180°. At this time, the two half members 20, 40 are biased and held in the open state by the resilient connecting pieces 62 and need not be pressed by hand.

The open protector 10 is mounted on the branched part of the wires. At first, the protector 10 is brought closer to the branched part of the wires while the first main-line tube holders 24A and the first branch-line tube holder 24B are positioned with respect to the main-line corrugated tubes 80A and the branch-line corrugated tube 80B so that specified parts of the respective main-line corrugated tubes 80A and the branch-line corrugated tube 80B are arranged in the protector 10. At this time, the resilient connecting pieces 62 hold the two half members 20, 40 in the opened state. Thus, the mounting operation can be performed while the first half member 20 is held by only one hand and the corrugated tubes 80A, 80B can be held by the other hand.

The guiding slants 31A, 31B of the temporary fixing ribs 26A, 26B are pressed into the grooves 81A, 81B of the corrugated tubes 80A, 80B. More particularly, the guiding slants 31A, 31B are arranged substantially along the bottom surfaces of the grooves 81A, 81B of the respective corrugated tubes 80A, 80B. Therefore the respective temporary fixing ribs 26A, 26B can be held without being displaced relative to the corrugated tubes 80A, 80B.

The first half member 20 is pressed against the branched part of the wires in this state. As a result, the temporary fixing ribs 26A, 26B are deformed out with the axial lines of the supporting shafts 36A, 36B as centers. Thus, the introducing portions 32A, 32B of the temporary fixing ribs 26A, 26B contact the bottom surfaces of the grooves 81A, 81B. The first half member 20 then is pressed further so that the introducing portions 32A, 32B move up along the arcuate bottom surfaces of the grooves 81A, 81B towards and beyond positions where the spacing between the introducing portions 32A, 32B is maximized. The protector 10 is pushed to a position where the inner circumferential surfaces of the tube holders 24A, 24B are near protuberances 82A, 82B of the respective corrugated tubes 80A, 80B. Thus, the stand-up ends 27A, 27B of the temporary fixing ribs 26A, 26B embrace the corrugated tubes 80A, 80B (see FIG. 8). The temporary fixing ribs 26A, 26B are held engaged with the grooves 81A, 81B by their own resilient restoring forces. In this way, the temporary fixing ribs 26A, 26B prevent lateral displacements of the respective corrugated tubes 80A, 80B, the disposition of the respective temporary fixing ribs 26A, 26B in the grooves 81A, 81B prevent longitudinal displacement and the stand-up ends 27A, 27B prevent upward movements from the first half member 20. Thus, the corrugated tubes 80A, 80B need not be held by hand to prevent displacements relative to the first half member 20. The ribs 25A, 25B of the tube holders 24A, 24B engage the grooves 81A, 81B of the corrugated tubes 80A, 80B, and displacement of the corrugated tubes 80 in the longitudinal directions also is restricted by the ribs 25A, 25B. It should be noted that the main-line temporary fixing ribs 26A between which the main-line corrugated tubes 80A are fit, are deformed outwardly.

The respective temporary fixing ribs 26A, 26B are engaged simultaneously with the corresponding corrugated tubes 80A, 80B. However, the main-line temporary fixing ribs 26A and the branch-line temporary fixing ribs 26B may be engaged successively with the corrugated tubes 80A, 80B.

The second half member 40 then is closed towards the first half member 20. At this time, parts of the wires exposed from the main-line corrugated tubes 80A and the branch-line corrugated tube 80B are held by the wire protrusion preventing portions 21 so as not to protrude from the first half member 20. Accordingly, upon closing the two half members 20, 40, the wires need not be pressed by the hand to avoid getting caught between the contact edges 23, 24 of the two half members 20, 40. All of the corrugated tubes 80A, 80B are held by the temporary fixing ribs 26A, 26B so as not to be displaced, and they need not be held by the hand or by clamps to prevent displacement. In other words, the hands are used only to hold the first and second half members 20, 40 to perform the closing operation and the efficiency of the mounting operation is improved compared to the case where the half members are closed while the wires and the corrugated tubes are held by the hand. Accordingly, operability of the protector is improved.

The temporary fixing ribs 26A, 26B enter the corresponding windows 47A, 47B of the second half member 40 as the second half member 40 is closed toward the first half member 20. The main-line temporary fixing ribs 26A are in deformed positions and pass inside the connecting portions 52A of the deformation restricting portions 48A. However, the escaping surfaces 49A of the connecting portions 52A ensure that the temporary fixing ribs 26A are inserted smoothly without catching the outer edges.

The lock pieces 53A, 53B contact the inclined surfaces 38A, 38B of the lock projections 37A, 37B and deform to move over the lock projections 37A, 37B. The lock pieces 53A, 53B then restore resiliently to engage the lock projections 37A, 37B at substantially the same time as the contact edges 23, 43 of the two half members 20, 40 contact each other.

In this way, the two half members 20, 40 engage each other at the ends of the tube holding portions 24A, 24B and are locked. The wire protrusion preventing portions 21 are fit into the fitting recesses 41 and are assembled without projecting inwardly or outwardly from the peripheral walls of the two half members 20, 40. Additionally, the pressing portions 45A, 45B of the second half member 40 press the respective corrugated tubes 80A, 80B.

The ribs 25A, 25B, 46A, 46B and the temporary fixing ribs 26A, 26B of the two half members 20, 40 are fit in the grooves 81A, 81B of the corrugated tubes 80A, 80B when the protector 10 is mounted on the branched part of the wires. Thus, the corrugated tubes 80A, 80B are less likely to detach from the protector 10 than in the case where only the ribs 25A, 25B are fit.

As described above, the corrugated tubes 80A, 80B need not be held by the hand to prevent displacement relative to the first half member 20 upon mounting the protector 10. Therefore the efficiency of the mounting operation of the protector 10 is improved.

Further, corrugated tubes 80A with a large diameter can be mounted and will deform the temporary fixing ribs 26A outwardly. Thus, the half members 20, 40 can be assembled while the outwardly deformed temporary fixing ribs 26 are inserted into the windows 47A. As a result, even the corrugated tubes 80A with a large diameter can be mounted easily between the temporary fixing ribs 26A.

The main-line ribs 46A of the second half member 140 are fit into the grooves 81A of the main-line corrugated tubes 80A and the inner edges thereof contact the bottom surfaces of the grooves 81A. When the second half member 40 is rotated further towards the first half member 20, the main-line resilient pressing portions 45A are pressed out and displaced by the main-line ribs 46A and the grooves 81A. Further, the branch-line ribs 46B enter the grooves 81B of the branch-line corrugated tube 80B.

Upon reaching a properly closed state where the contact edges 23, 43 of the half members 20, 40 are in contact, the main-line ribs 46A are urged into the grooves 81A of the main-line corrugated tubes 80A by inward resiliently restoring forces of the resilient pressing portions 45A, and the branch-line ribs 46B are inserted into the grooves 81B of the branch corrugated tube 80B with the inner edges thereof at positions before the bottom surfaces of the grooves 81B. In addition, the elongated ribs 25A, 25B on the first half member 20 fit into the grooves 81A, 81B of the respective corrugated tubes 80A, 80B.

Figure 10:
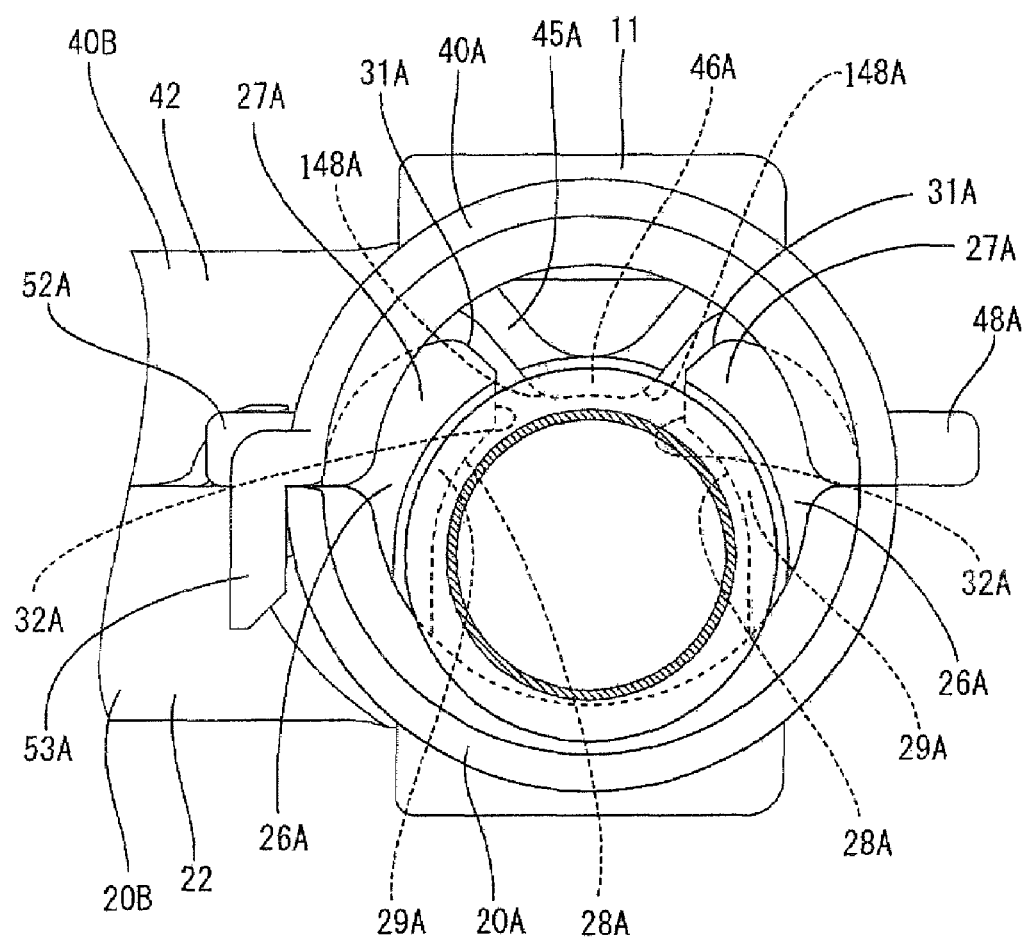
FIG. 10 is a partial enlarged section showing a state where the main-line tube engaging portion is engaged with a corrugated tube with a smaller diameter than that of the main-line corrugated tube.

The main-line corrugated tubes 80A mounted on the main line of the wires have the maximum diameter to be accommodated in the main line portion 11 of the protector 10, and the branch-line corrugated tube 80B mounted on the branch line has the minimum diameter out of the corrugated tubes that can be accommodated in the branch line portion 12 of the protector 10. However, the protector 10 can be mounted without difficulty even if corrugated tubes with a diameter smaller than that of the main-line corrugated tubes 80A, for example, mounted on the main line of the wires and a corrugated tube with a diameter larger than the branch-line corrugated tube 80B is mounted on the branch line of the wires. If corrugated tubes with a diameter smaller than the main-line corrugated tubes 80A are mounted on the main line of the wires, the main-line temporary fixing ribs 26A and the main-line second ribs 46A then engage the corrugated tubes while being displaced less than in the above case or while not being displaced at all, as shown in FIG. 10. For example, if a corrugated tube with a diameter larger than that of the branch-line corrugated tube 80B is mounted on the branch line of the wires, the branch-line temporary fixing ribs 26B and the branch-line ribs 46B are displaced in conformity with the diameter of the corrugated tube to engage the larger-diameter corrugated tube as shown by chain double-dashed line in FIG. 11.

As described above, the pairs of temporary fixing ribs 26A, 26B on the first half member 20 and the second ribs 46A, 46B on the second half member 40 are displaced substantially in conformity with the diameters of the corrugated tubes and are fit into the grooves 81A, 81B of the corrugated tubes upon mounting the protector 10 on the branched part of the wires. Therefore, the protector 10 can be mounted on corrugated tubes with different diameters.

Mounting portions 70 are provided on the first and second half members 20, 40 for receiving an engaging part 230.

Figure 14:
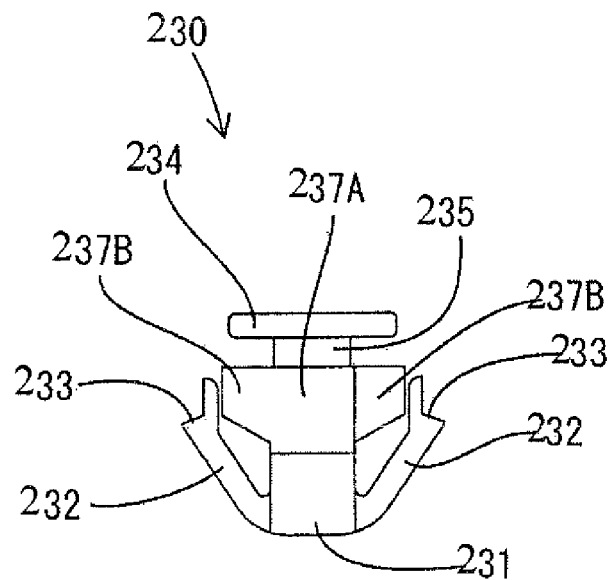
FIG. 14 is a side view of the engaging part.

The engaging part 230 is separate from the protector 10 and includes a leg 231 shaped for insertion into the at least one fixing hole (see FIG. 14). The leg 231 is a substantially rectangular parallelepiped longer in an inserting direction into the fixing hole. In the following description, the front of the engaging part 230 is the leading end during insertion into the fixing hole and the rear end is opposite the front end.

Two long narrow resilient engaging pieces 232 extend obliquely back from opposite sides of the front end of the leg 231 so that that the spacing between the engaging pieces 232 increases at more rearward positions. The free ends of the engaging pieces 232 are resiliently deformable in directions towards each other. Latches 233 are formed near the free ends of the resilient engaging pieces 232 and are engageable with edges of the fixing hole.

Figure 15:
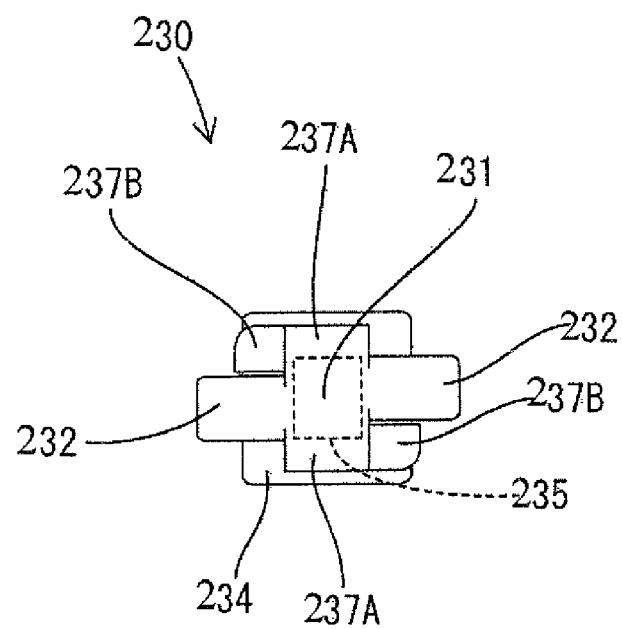
FIG. 15 is a plan view of the engaging part.
Figure 16:
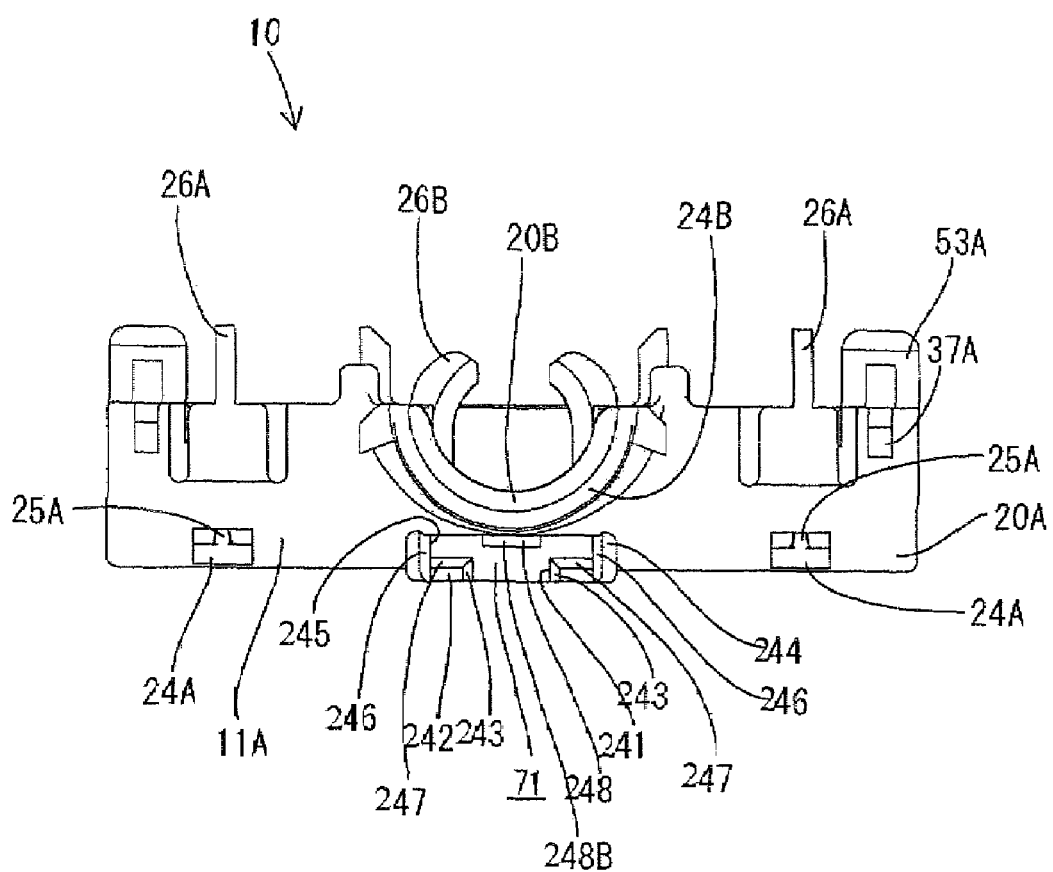
FIG. 16 is side view of the protector with the half members open.
Figure 17:
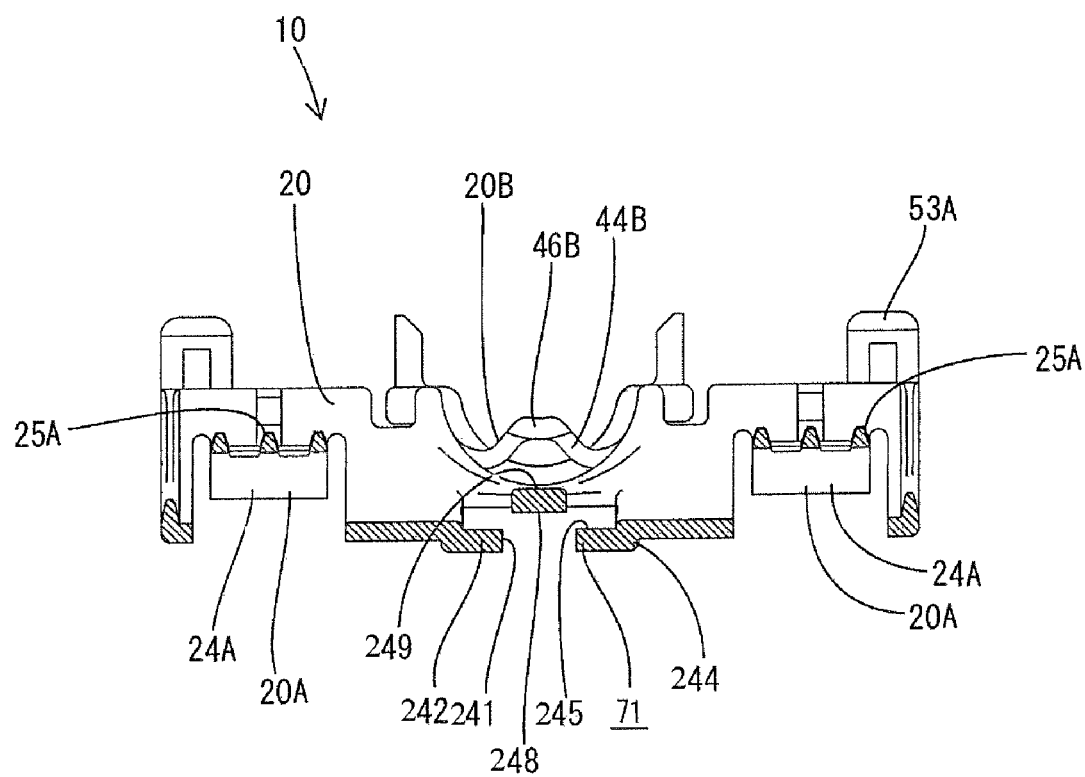
FIG. 17 is a section of the protector showing the shape of a mounting portion.

A substantially square bulging plate 234 is provided at the rear end of the engaging leg 231 and bulges out in directions substantially perpendicular to the axial line of the leg 231 (see FIG. 15).

An inserting portion 235 is defined on the engaging leg 231 adjacent the bulging plate 234 and can be inserted into a mount groove 241 of the mounting portion 71. The inserting portion 235 has a substantially square or rectangular cross-section along a plane substantially parallel to the plate surface of the bulging plate 234. The inserting portion 235 is provided at an intermediate position of the bulging plate 234, and its four sides are parallel with the four sides of the bulging plate 234.

A recess 236 is formed in the rear surface of the bulging plate 234 and opposite to the leg 231. The recess 236 has substantially the same shape as the cross-sectional shape of the inserting portion 235 and has a depth less than about ⅔ of, preferably about half the thickness of the bulging plate 234 (see FIG. 18). The four sides of the recess 236 are substantially parallel to those of the inserting portion 235 and the bulging plate 234.

First and second pairs of projections 237A, 237B are provided at a part of the leg 231 immediately before the inserting portion 235. The projections 237A, 237B of each pair are arranged at positions substantially symmetrical with respect to the axial line of the leg 231.

The first projections 237A project in directions intersecting the facing directions of the resilient engaging pieces 232 and project substantially the same distance in directions away from the inserting portion 235. Rear portions of the first projecting portions 237A are in the form of blocks projecting from a specified distance from the inserting portion 235, and front portions thereof are tapered towards the leading end of the engaging leg 231 to gradually decrease the projecting distance from the inserting portion 235 (see FIG. 18).

The second projections 237B project in the directions of the resilient engaging pieces 232 and are arranged at positions substantially orthogonal to the facing directions of the resilient engaging pieces 232 (see FIG. 15). Thus, the two resilient engaging pieces 232 are deformable in directions towards the engaging leg 231 without touching the second projections 237B.

The second projections 237B project from the block-shaped rear halves of the corresponding first projections 237A, and front surfaces thereof are inclined towards the front to reduce the projecting distances (see FIG. 14).

The rear surfaces of the first and second projections 237A, 237B are substantially parallel to the front surface of the bulging plate 234, and are spaced from the front surface of the bulging plate 234 by a distance substantially equal to or slightly longer than the thickness of a guide plate 242 to be described later.

The mounting portion 71 is provided on each of the first and second half members 20, 40. The mounting portions 71 are substantially identically shaped and are arranged substantially symmetrically with respect to the hinge 227, so that the same engaging part 230 can be mounted on either of the first and second half members 20, 40. In view of the identical shapes, only the mounting portion 71 of the first half member 20 is described.

The mounting portions 71 of the first and second half members 20, 40 are provided in a substantially in a central part of the main line portion 20A between the main-line tube engaging portions 24A.

Figure 13:
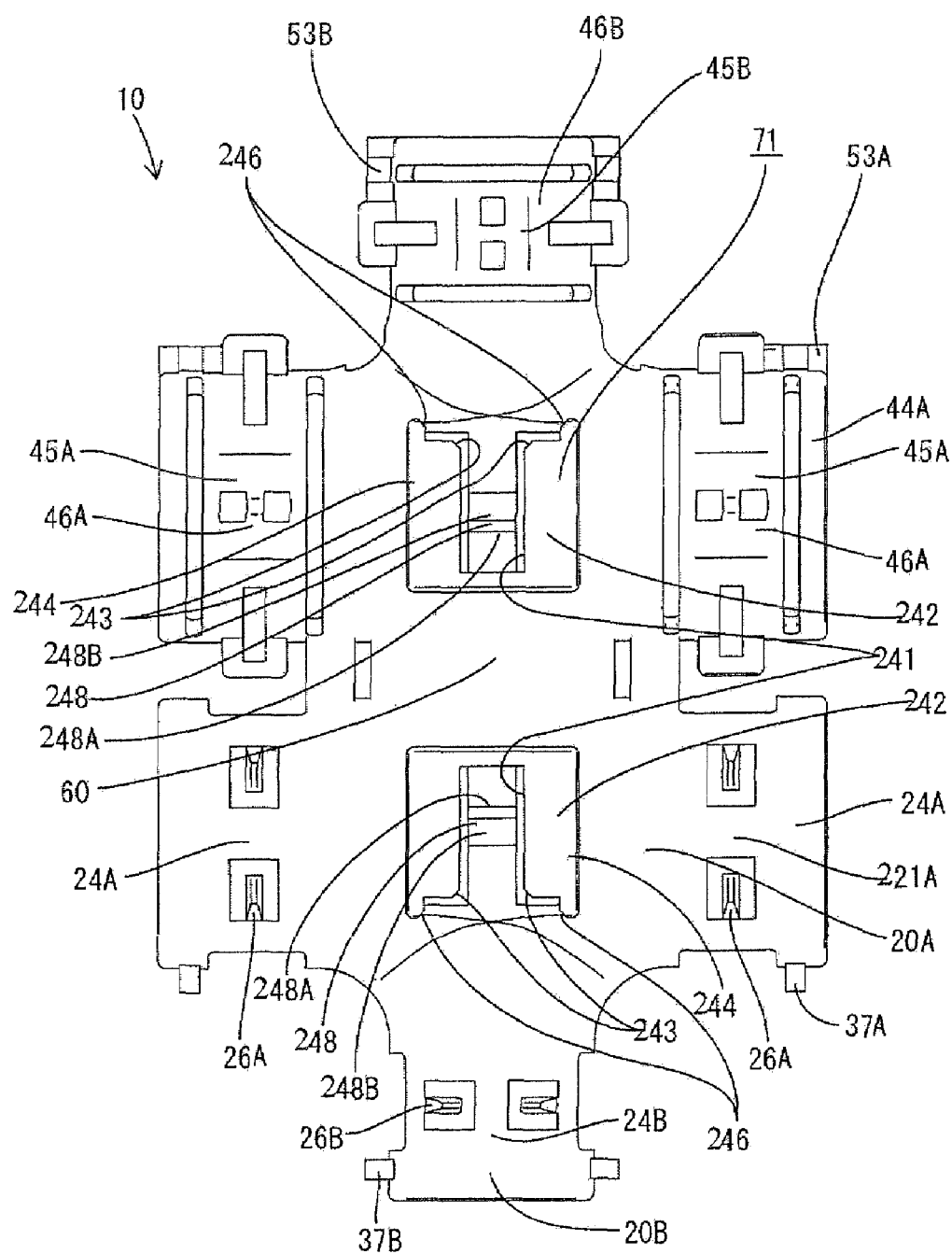
FIG. 13 is a plan view showing the state where the two half members are in the open state when the protector is seen from the outside.
Figure 19:
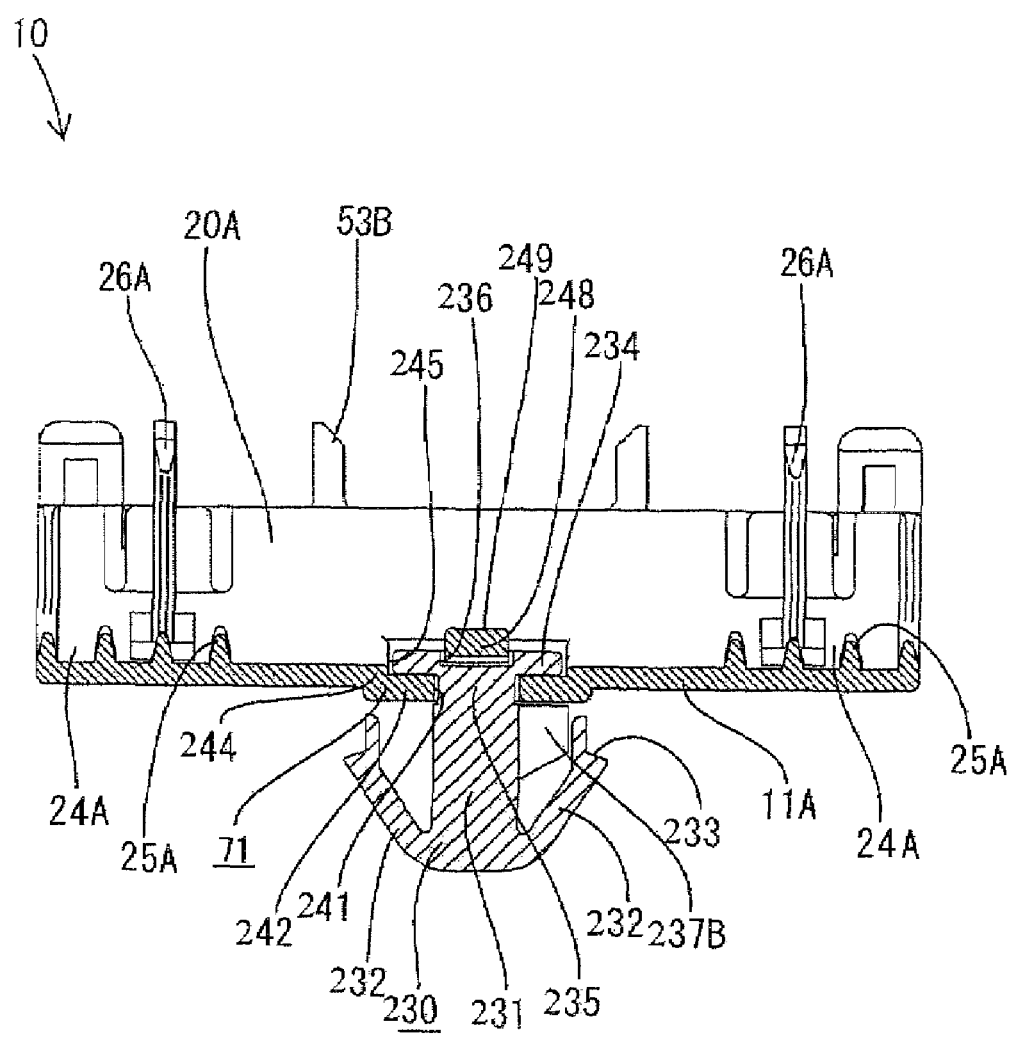
FIG. 19 is a longitudinal section showing the state where the engaging part is mounted on the protector.

As shown in FIG. 13, the mounting portion 71 includes a guide plate 242 formed with the mount groove 241 for receiving the leg 231. The guide plate 242 is substantially square and is substantially equal to or slightly larger than the bulging plate 234 of the engaging part 230. The guide plate 242 has a thickness substantially equal to that of the first half member 20, and is provided at a position slightly outwardly of the first half member 20 (see FIG. 19). Two of the four sides of the guide plate 242 are substantially parallel to the axial line of a first main line portion 20A of the first half member 20.

The mount groove 241 is a substantially rectangular cutout longer in the branching direction of the branch line 212 of the first half member 20 and extending from the side of the guide plate 242 near a first branch line portion 20B of the first half member 20 constituting or forming part of the branch 12 towards the opposite side near the hinge 60. The mount groove 241 is open towards the side opposite to the hinge 60. Two slanted surfaces 243 are formed at the opening end of the mount groove 241 and are inclined to widen the mount groove 241 in a shorter-side direction towards the open end.

The width of the mount groove 241 at locations spaced from the slanted surfaces 243 is substantially equal to or slightly larger than the width of the inserting portion 235 of the leg 231. The leg 231 is insertable into the mount groove 241 in orientations displaced at substantially 90° intervals about the axial line thereof.

A surrounding wall 244 connects the guide plate 242 with the first half member 20 at all sides except the side where the mount groove 241 is formed. The surrounding wall 244 has a substantially square shape in conformity with the three sides of the guide plate 242, and the bulging plate 234 of the engaging part 230 can be accommodated in a space enclosed by the surrounding wall 244 in any of orientations displaced at substantially 90° intervals. An accommodating space 245 is enclosed by the surrounding wall 244 and the guide plate 242 and can receive the bulging plate 234.

Surrounding-wall slanted surfaces 246 are formed at an open end of the surrounding wall 244 and are inclined to widen the entry for the accommodating space 245 into which the bulging plate 234 is inserted. Further, guide-plate slanted surfaces 247 are formed at an edge of the guide plate 242 where the open end of the mount groove 241 is located and are inclined to increase the height of the accommodating space 245 towards the open end. The surrounding-wall slanted surfaces 246 and the guide-plate slanted surfaces 247 correspond to a slanted surface for the bulging plate 234.

A resilient plate 249 is provided inwardly of the guide plate 242 and defines a portion of the accommodating space 245. The resilient plate 249 extends substantially in the circumferential direction of the first half member 20 at an inner position of the first half member 20 and is supported at both ends. Thus, the resilient plate 249 is deformable in and out on the first half member 20 to extend or shorten the distance to the guide plate 242.

By forming the resilient plate 249 at the inner side of the first half member 20 in this way, the engaging part 230 can be mounted at a position inwardly retracted from the first half member 20 as compared to the case where the resilient plate 249 is formed outwardly of the first half member 20. Thus, the projecting distance of the engaging part 230 from the first half member 20 with the engaging part 230 mounted on the mounting portion 71 can be reduced to help achieve miniaturization of the protector 10.

The mounting portion 71 is between the first main-line tube engaging portions 20A, and hence in a part where the corrugated tubes 80 are not accommodated, i.e. a part having an extra space for accommodating the engaging part 230. This efficient space utilization enables the protector 10 to be miniaturized without reducing a wire accommodation rate. The miniaturized protector 10 also can be used upon laying the bundle of wires in a very small place so that versatility is higher.

The resilient plate 249 is a substantially long narrow rectangle with a long dimension that extends parallel to the mount groove 241. Parts of the first half member 20 between the resilient plate 249 and the surrounding wall 244 are open and are covered by the guide plate 242. The outer surface of the resilient plate 249 facing the guide plate 242 is substantially flush with the outer surface of the branch 12.

A projection 248 is provided at a longitudinal intermediate position on the outer surface of the resilient plate 249 and has a width substantially equal to the width of the resilient plate 249. The projection 248, as seen from the guide plate 242 has a substantially rectangular shape slightly longer in width direction, as shown in FIG. 23, and a dimension thereof in longitudinal direction is substantially equal to or slightly smaller than the width of the recess 236. The recess 236 and the projection 248 are engageable even if the bulging plate 234 is inserted in other orientations displaced at 90° intervals.

Figure 18:
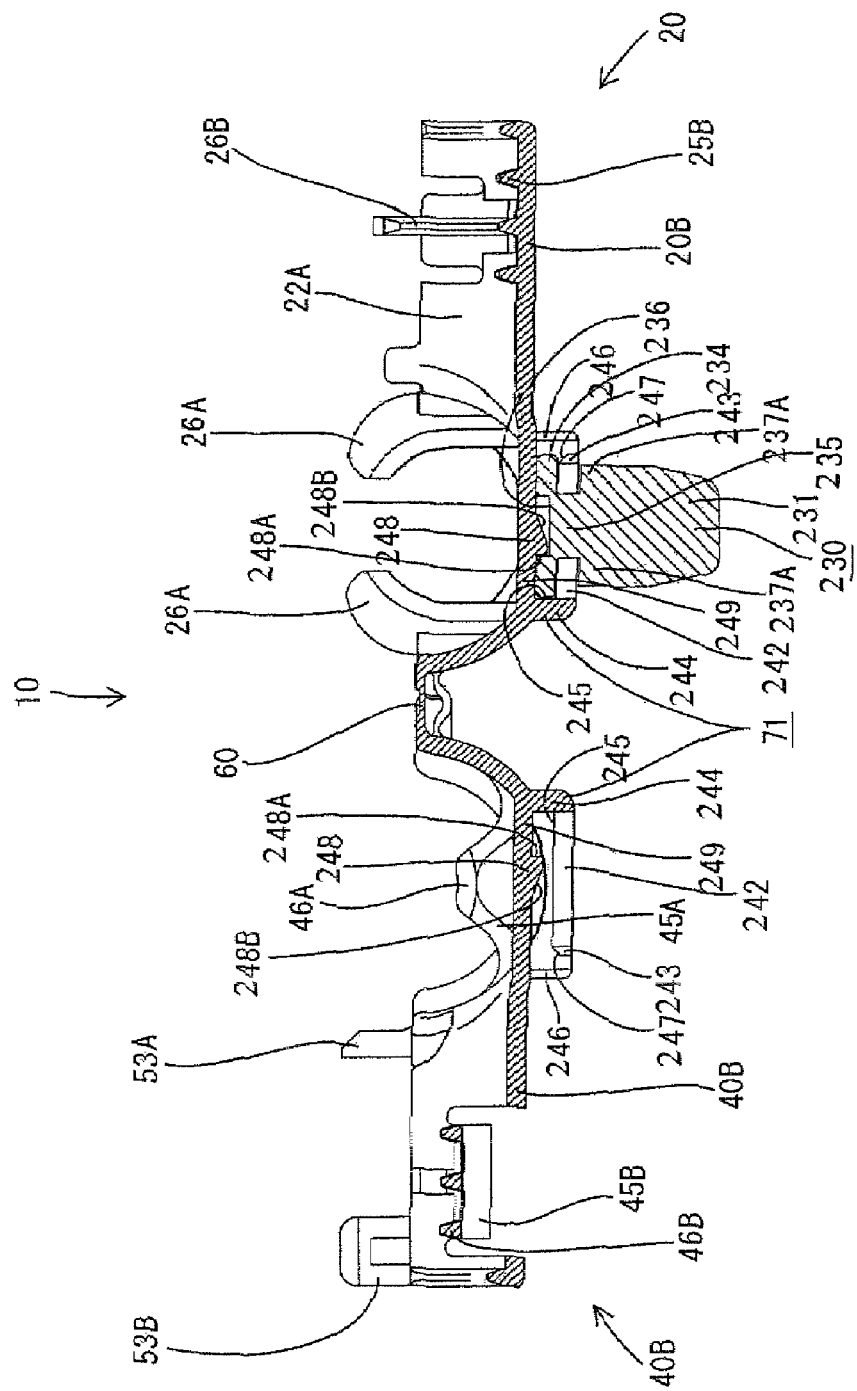
FIG. 18 is a lateral section showing a state where the engaging part is mounted on the protector.

As shown in FIG. 18, an engaging surface 248A is defined on the projection 248 facing the hinge 60 and is substantially perpendicular to the outer surface of the resilient plate 249. The engaging surface 248A faces a peripheral surface of the recess 236 when the projection 248 is fit into the recess 236. Additionally, the engaging surface 248A faces the other peripheral surface of the recess 236 even if the bulging plate 234 is inserted in another orientation displaced at 90° intervals, and a displacement of the bulging plate 234 in a withdrawing direction from the accommodating space 245 is prevented in any of these orientations.

A riding surface 248B is defined on a portion of the projection 248 opposite to the engaging surface 248A and is inclined to gradually increase the projecting distance toward the engaging surface 248A. The projecting end surface of the projection 248 is substantially parallel to the outer surface of the resilient plate 249 and is located inwardly of the outer surface of the first main line portion 211A of the first half member 20.

Figure 12:
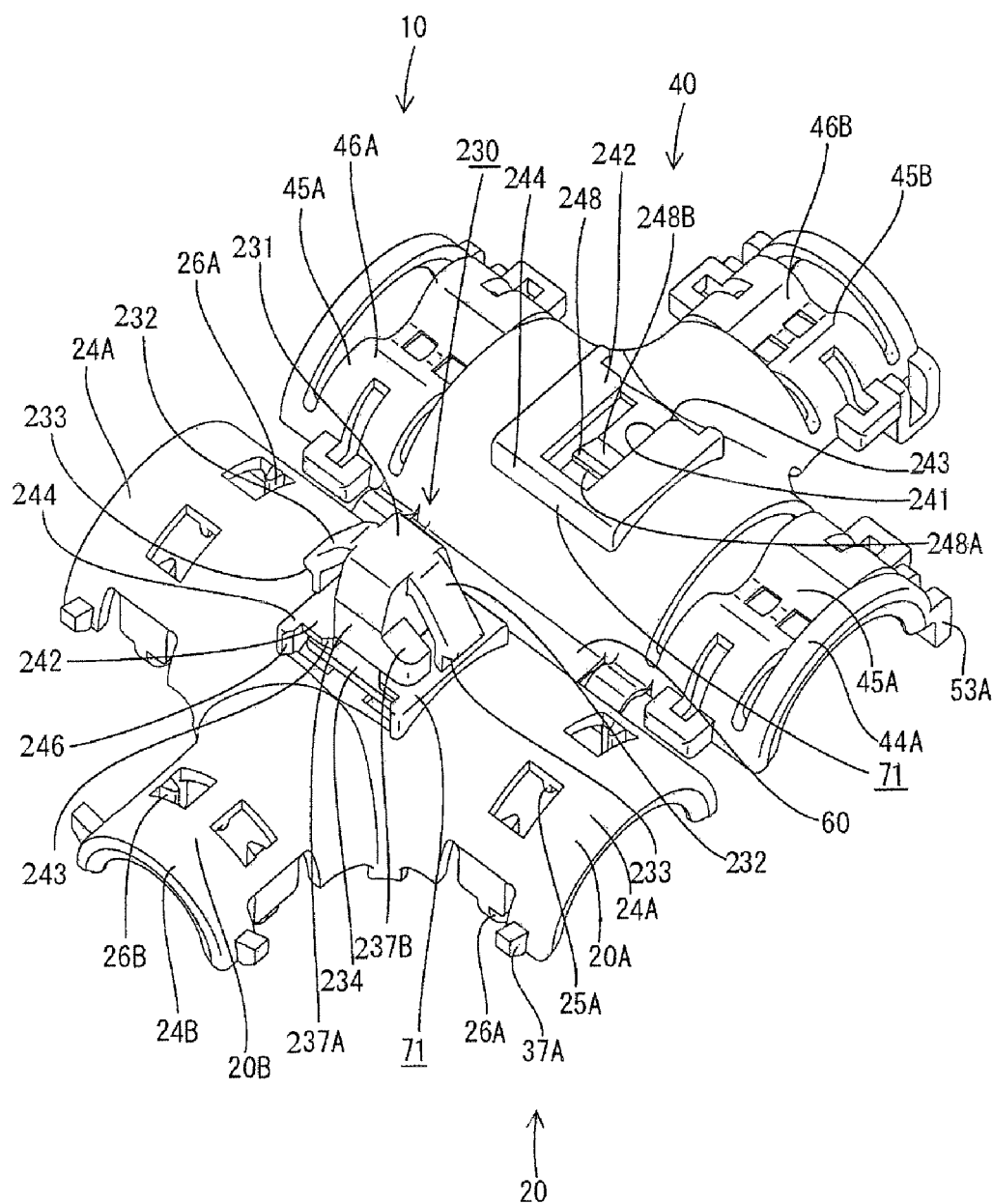
FIG. 12 is an external perspective view showing a state where an engaging part is mounted on the protector.

The following description of an operation of fixing the bundle of wires to the object is described for the case where the engaging part 230 is mounted on the mounting portion 71 of the first half member 20 in the posture shown in FIG. 12 so that the resilient engaging pieces 232 face each other in the longitudinal direction of the first main line portion 20A.

First, the bulging plate 234 is brought closer to the first main line portion 20A with the engaging part 230 set in a mounting posture where the resilient engaging pieces 232 face each other in the longitudinal direction of the first main line portion 20A and so that the bulging plate 234 is opposed to the accommodating space 245. The engaging part 230 then is moved towards the mounting portion 71 by sliding the bulging plate 234 along the outer surface of the first branch 212A and into the accommodating space 245.

The guide-plate slanted surfaces 247 and the surrounding-wall slanted surfaces 246 guide the bulging plate 234 smoothly into the accommodating space 245. Further, the pair of second projections 237B reaches the outer side of the guide plate 242 and the guide plate 242 moves gradually between the bulging plate 234 and the second projection 237B.

The slanted surfaces 243 guide the leg 231 smoothly into the mount groove 241 as the engaging part 230 is inserted further. Further, one end of the bulging plate 234 gradually moves onto the riding surface 248B of the projection 248 so that the bulging plate 234 can advance without getting caught by the projection 248. Thus, the engaging part 230 can be mounted easily.

The resilient plate 249 is displaced away from the guide plate 242 as the bulging plate 234 moves onto the projection 248 of the resilient plate 249. Further, the second projection 237B at the rear end in the inserting direction reaches the outer side of the guide plate 242 and the bulging plate 234 is inserted between the second projection 237B and the guide plate 242.

The peripheral surface of the recess 236 of the bulging plate 234 facing the hinge 227 moves over the projection 248 when the engaging part 230 reaches a position where the bulging plate 234 is accommodated completely in the accommodating space 245. Thus, the resilient plate 249 is restored resiliently and, substantially the same time, the recess 236 and the projection 248 are engaged. The engaging surface 248A of the projection 248 faces the peripheral surface of the recess 236. Accordingly, the bulging plate 234 is held in the accommodating space 245 between the guide plate 242 and the resilient plate 249 and cannot be displacement from the accommodating portion 245 in the withdrawing direction. Further, the guide plate 242 is held between the two second projections 237B and the bulging plate 234 to suppress shaking of the engaging part 230 and the mounting portion 71. The second projections 237B are arranged at diagonal positions of the engaging part 230 to prevent inclination of the engaging part 230 with respect to the inserting direction. In this way, the engaging part 230 is held mounted on the mounting portion 71.

The protector 10 then is mounted on the branched part of the wires. The resilient engaging pieces 232 slide in contact with the edge of the fixing hole and deform resiliently when the leg 231 of the engaging part 230 is inserted into the fixing hole. The resilient engaging pieces 232 are restored resiliently when the engaging leg 231 is inserted to a specified position so that the latches 233 engage the edge of the fixing hole to retain the engaging leg 231. In this way, the bundle of wires is fixed to the object.

Although the engaging part 230 is mounted on the protector 10 before the protector 10 is engaged with the branched part of the wires in this embodiment, the invention is not so limited. For example, the engaging part 230 may be mounted on the protector 10 after the protector is mounted on the branched part of the wires.

The engaging part 230 can be mounted in postures other than the above-described posture. For example, the engaging part 230 can be mounted as follows if the resilient engaging pieces 232 face in the longitudinal direction of the first branch 20B and in a posture displaced by 90° about the axial line of the leg 231 as compared to the above posture.

More particularly, the engaging part 230 is moved towards the mounting portion 240 with the resilient engaging pieces 232 facing each other in the longitudinal direction of the first branch 212A. The bulging plate 234 then is slid along the outer surface of the first branch 212A and is inserted farther into the accommodating space 245 so that the engaging part 231 enters the mount groove 241. Further, the first projections 237A reach the outer side of the guide plate 242 and the guide plate 242 is inserted between the first projections 237A and the bulging plate 234. In the same manner as described above, the guide-plate slanted surfaces 247, the surrounding-wall slanted surfaces 246 and the slanted surfaces 243 ensure that the bulging plate 234 and the leg 231 are inserted smoothly.

The engaging part 230 is inserted farther so that the bulging plate 234 moves onto the riding surface 248B without getting caught by the projection 248 and the resilient plate 249 is displaced in and away the guide plate 242. The resilient plate 249 is restored resiliently when the engaging part 230 reaches a position where the bulging plate 234 is accommodated completely in the accommodating space 245 and, at substantially the same time, the recess 236 and the projection 248 engage. In this way, the bulging plate 234 is held in the accommodating space 245 between the guide plate 242 and the resilient plate 249 and cannot be displaced from the accommodating space 245 in the withdrawing direction. At this time, the guide plate 242 is held between the two first projections 237A and the bulging plate 234 to suppress relative shaking of the engaging part 230 and the mounting portion 71. In this way, relative shaking movements of the engaging part 230 and the mounting portion 71 can be suppressed by either the first projections 237A or the second projections 237B regardless of the mounting posture of the engaging part 230.

The engaging part 230 can be mounted on the mounting portion 71 in any one of the mounting postures displaced at 90° intervals about the axial line of the leg 231. In other words, the engaging part 230 can be mounted in any one of several mounting postures. Hence, the engaging part 230 is highly versatile and need not be corrected to the single posture determined for the mounting portion 71 upon being mounted on the protector 10. Accordingly labor and time for the mounting operation can be reduced.

The engaging part 230 can be mounted on a selected one of the first and second half members 20, 40. In contrast, if the engaging part 230 could be mounted only on one of the half members 20, 40, e.g. in the case of successively mounting plural protectors in the longitudinal direction of the bundle of wires into fixing holes of an object, the protector could have to be remounted in the worse case scenario, requiring time and labor if the engaging leg 231 is facing a side opposite to the fixing hole. However, according to this embodiment, it is sufficient to remount the engaging part 230 on the opposite half member. Therefore, convenience can be improved upon fixing the protector to the object.

Further, the protector can be used merely to keep a wire branching direction without the engaging part 230 being mounted, thereby further improving versatility.

The invention is not limited to the above described and illustrated embodiments. For example, the following embodiments are also embraced by the technical scope of the present invention as defined by the claims.

The protector is comprised of two half members connected by the hinge in the illustrated embodiments. However, they may not be connected by the hinge.

The protector is substantially T-shaped in the illustrated embodiments so that the branch is branched off substantially at right angles to the main line portion. However, the shape of the protector is not limited thereto. The protector may have a cylindrical shape without having the branch line portion or having a different configuration or shape.

The separate main-line corrugated tubes are held at the opposite ends of the main line portion of the protector in the illustrated embodiments. However, one corrugated tube having a dimension longer than the longitudinal dimension of the main line portion may be used and held so that the opposite ends thereof project from the main line portion.

The temporary fixing ribs 26A, 26B are continuous with the first peripheral wall 22 via the supporting shafts 36A, 36B in the first embodiment and are displaceable inward and outward about the axial lines of the supporting shafts 36A, 36B. However, they may be continuous with the first peripheral wall 22 without the supporting shafts and may not be displaceable.

Two temporary fixing ribs 26A, 26B are provided on each of the main-line tube holders 13 and branch-line tube holder 14 in the first embodiment. However, they need not be provided on each tube holder.

The second peripheral wall 42 is formed with the windows 47A, 47B for permitting the penetration of the temporary fixing ribs 26A, 26B in the first embodiment. However, the windows may not necessarily be formed or may extend from the second peripheral wall to the first peripheral wall.

The second half member 40 is provided with the deformation restricting portions 48A, 48B for preventing displacements of the temporary fixing ribs 26A, 26B beyond the specified degree in the first embodiment. However, the deformation restricting portions may be provided on the first half member or may be not provided at all.

The resilient connecting pieces 62 are connected with the two half members 20, 40 at opposite side positions of the hinge 60 in the first embodiment. However, a resilient connecting piece may be provided, for example, between a pair of hinges or the two half members may be connected by only the hinge without providing any resilient connecting pieces.

The wire protrusion preventing portions 21 stand up from the first half member 20 in the first embodiment, but they need not be provided.

The wire protrusion preventing portions 21 stand up at the corners between the first main line portion 20A and the first branch 20B in the first embodiment. However, they may be provided at any positions where the protrusion of the wires can be prevented.

The wire protrusion preventing portions 21 project from the first contact edge 23 in the first embodiment, but they may project, for example, from the inner circumferential surface of the first half member or other location.

The locks are arranged at the positions closer to the distal ends of the main-line tube holders 13 and the branch-line tube holder 14 than the temporary fixing ribs 26A, 26B in the first embodiment. However, they may be at positions closer to the centers than the temporary fixing ribs.

The first half member 20 is provided with the ribs 25A, 25B insertable into the grooves 81A, 81B of the corrugated tubes 80A, 80B in the first embodiment. However, the ribs may not necessarily be provided.

The ribs 26 also may be provided to fix the corrugate 80 in a properly assembled state beyond a temporary fixing. Moreover, there may be provided one single rib 26 and on the substantially opposite side there may be provided a support for supporting the corrugate tube in a posture so that the rib 26 may fit into the respective groove 81 of the corrugate tube 80.

Thicknesses of the resilient tube holders 44A, 44B in inward and outward directions are substantially constant, they may not necessarily be constant.

The openings 149A, 149B are formed between the three second ribs 147A, 147B of each resilient tube holders 44A, 44B. However recesses may be formed instead of the openings or neither the openings nor the recesses may be formed.

Although the inclined surfaces 151A, 151B are formed between the second ribs 147A, 147B of the resilient tube holders 44A, 44B, they may not be formed.

The temporary fixing ribs 26A, 26B have a height to project more than the first contact edge 23 in the assembling direction with the second half member 40. However, they may be at substantially the same height as or lower than the first contact edge.

The temporary fixing ribs 26A, 26B are continuous with the first peripheral wall 22 via the supporting shafts 36A, 36B and are resiliently displaceable in the opening and closing directions relative to each other about the axial lines of the supporting shafts 36A, 36B. However other resiliently displaceable supports for the temporary fixing ribs can be provided.

One pair of temporary fixing ribs 26A, 26B are provided on each of the main-line tube engaging portions 13 and branch-line tube engaging portion 14. However, they need not be provided on each tube engaging portion.

The second half member 40 has the deformation restricting portions 53A, 53B for limiting displacements of the temporary fixing ribs 26A, 26B. However, the deformation restricting portions may be provided on the first half member or may be not provided at all.

Although the elongated projections 25A, 25B are insertable into the grooves 81A, 81B of the corrugated tubes, the elongated projections need not be provided.

Although the resilient plate 249 is provided at the inner position of the first half member 20, it may be provided at an outer position of the first half member 20.

Although the resilient plate 249 is supported at both ends, it may be supported at only one end.

The resilient plate 249 has the projection 248 and the bulging plate 234 has the recess 236. However, the resilient plate may have the recess and the bulging plate may have the bulging plate.

The bulging plate 234 is square. However, the bulging plate 234 may have any shape provided that it is insertable into the accommodating portion 245 even if the orientation is changed. For example, the bulging plate 234 may be substantially rectangular.

The inserting portion 235 of the leg 231 has a substantially square cross-section. However, the inserting portion 235 may have any shape provided that it is insertable into the mount groove 241 even if the orientation thereof is changed. For example, the inserting portion 235 may have a substantially circular or elliptic shape.

Although the mounting portion 71 is on each of the half members 20, 40, it may be provided on either one of them.

Although the leg 231 includes the first and second projections 237A and 237B in the third embodiment, they may be omitted. Alternatively, only the first or second projections may be provided.

Although two first and second projections 237A and 237B are provided, only one of each of the first and second projections may be provided.

The mounting portion 71 is aligned so that the engaging part 230 is inserted parallel to the branching direction of the branch 12 in the third embodiment, but it may be aligned in any direction.

The outer surfaces of the resilient plate 249 and the branch 12 are substantially flush with each other, but they need not be flush with each other.

The slanted surfaces 243 for the engaging leg are formed at the open end of the mount groove 241 for the leg 231, but need not be formed.

The surrounding-wall slanted surfaces 246 and the guide-plate slanted surfaces 247 are formed at the open end of the accommodating space 245, but either or both may be omitted.

The inclined riding surface 248B is formed at the front of the projection 248, but may be omitted.

The engaging part 230 is mountable on the mounting portion 71 in different orientations displaced at 90° intervals about the axial line of the leg 231. However, the orientations may be changed at any angular intervals with respect to the axial line or may not be changed at regular angular intervals provided that the engaging part can be mounted in different orientations.

What is claimed is:

1. A protector, comprising first and second split members configured for assembly with one another and having a substantially tubular shape upon assembly for holding at least one corrugated wire protection tube between the split members, the first split member having a contact edge engageable with the second split member, ribs projecting beyond the contact edge of the first split member and standing up adjacent to the corrugated tube, and the ribs being shaped for insertion into a groove of the corrugated tube, the ribs having stand-up ends bent towards each other along the groove of the corrugated tube, windows being formed at positions on the second split member corresponding to the ribs for permitting penetration of the ribs.

2. The protector of claim 1, wherein the rib is configured for temporarily fixing the corrugated tube.

3. The protector of claim 1, wherein supporting shafts are provided at base ends of the ribs substantially opposite to the stand-up ends, the supporting shafts extending in a longitudinal direction of the split members and connecting the ribs with a peripheral wall of the first split member.

4. A protector, comprising first and second split members configured for assembly with one another and having a substantially tubular shape upon assembly for holding at least one corrugated wire protection tube between the split members, the first split member having a contact edge engageable with the second split member, ribs projecting beyond the contact edge of the first split member and standing up adjacent to the corrugated tube, the ribs being shaped for insertion into a groove of the corrugated tube, the ribs having stand-up ends bent towards each other along the groove of the corrugated tubes, wherein at least one of the split members includes deformation restricting portions radially outward of the ribs for limiting radially outward displacements of the ribs.

5. The protector of claim 4, wherein the split members are connected via at least one hinge, and at least one resilient connecting piece for biasing the split members at least in opening directions is provided between the two split members.

6. A protector, comprising first and second split members configured for assembly with one another and having a substantially tubular shape upon assembly for holding at least one corrugated wire protection tube between the split members, the first split member having a contact edge engageable with the second split member, ribs projecting beyond the contact edge of the first split member and standing up adjacent to the corrugated tube, the ribs being shaped for insertion into a groove of the corrugated tube, the ribs having stand-up ends bent towards each other along the groove of the corrugated tubes, wherein the first split member has at least one wire protrusion preventing portion projecting beyond the contact edge in an assembling direction with the second split member for preventing protrusion of the wires exposed from the corrugated tube to outside the first split member.

7. The protector of claim 6, wherein the split members are to be mounted on a branched part of the wires and each of the split members has at least one main line portion to be mounted on a main line of the wires and at least one branch to be mounted on a branch line of the wires.

8. The protector of claim 7, wherein main-line tube holding portions are defined at opposite ends of the main line portion for holding a main-line corrugated tube, and a branch tube holding portion is defined at an end of the branch spaced from the main line portion for holding a branch-line corrugated tube.

9. The protector of claim 8, wherein each of the main-line tube holding portions and the branch-line tube holding portion includes a pair of the ribs.

10. The protector of claim 9, wherein wire protrusion preventing portions project beyond the contact edge at corners between the main line portion and the branch of the first split member to prevent protrusion of wires to the outside of the first split member.

11. The protector of claim 10, wherein at least one fitting recess is formed on part of a peripheral wall of the second split member corresponding to the wire protrusion preventing portion and being shaped to engage with the wire protrusion preventing portion.

12. The protector of claim 7, further comprising locks on the main-line tube holding portion and the branch-line tube holding portion for holding the split members in an assembled state.

13. The protector of claim 12, wherein the locks are closer to distal ends of the main-line tube holding portions and the branch-line tube holding portion than the ribs.

14. A protector, comprising first and second split members configured for assembly with one another and having a substantially tubular shape upon assembly for holding at least one corrugated wire protection tube between the split members, the first split member including first ribs shaped to be arranged adjacent to the corrugated tube and configured for insertion into at least one groove of the corrugated tube, the first ribs being resiliently displaceable towards and away from the corrugated tube, the second split member including at least one second rib shaped to be at least partly insertable into at least one groove of the corrugated tube, the second rib being provided on a resilient portion of the second split member that is resiliently displaceable in inward and outward directions so that the second rib is resiliently displaceable in inward and outward directions of the split members.

15. The protector of claim 14, wherein the first ribs are arranged in pairs to be at opposite sides of the corrugated tube and are insertable into at least one groove of the corrugated tube, first ribs in each said pair are resiliently displaceable towards and away from one another.

16. The protector of claim 15, further comprising at least one elongated projection on the inner circumferential surface of the first split member and between the first ribs in the pair of first ribs, the elongated projection being insertable into at least one groove of the corrugated tube.

17. The protector of claim 14, wherein the second split member is formed with circumferentially extending slits disposed on opposite sides of the resilient portion.

18. The protector of claim 14, wherein the resilient portion is shaped to project substantially inwardly on the second split member and includes the second rib at an inwardly projecting part thereof.

19. The protector of claim 14, wherein a plurality of second ribs are provided, an opening being formed in the resilient portion between the second ribs, and the thickness of the resilient portion in inward and outward directions is substantially constant on all of the resilient portion.

20. The protector of claim 19, wherein an inclined surface conforming with the outer circumferential surface of a protrusion of the corrugated tube is formed between the second ribs.

21. The protector of claim 14, wherein the first ribs have a height to project more than a contact edge of the first split member with the second split member.

22. The protector of claim 14, wherein a supporting shaft joins the first ribs to the first split member, the supporting shaft extending substantially in the longitudinal direction of the first split member.

23. The protector of claim 14, wherein the first. split member is formed with windows for permitting displacements of the first ribs substantially in inward and outward directions.

24. The protector of claim 23, further comprising deformation restricting portions formed on the first split member at positions radially outward from the first ribs for limiting radially outward displacements of the first ribs.

25. The protector of claim 14, wherein each of the split members includes at least one main line portion to be mounted on a main line of the wires and at least one branch line portion unitary with the main line portion for mounting on a branch line of the wires.

26. A protector for fixing a bundle of wires to an object, comprising:
first and second split members engageable with at least one corrugated tube mounted on the bundle of wires; and
an engaging part mountable on a mounting portion of the split members and engageable with a fixing hole in the object, the engaging part including a leg shaped for insertion into the fixing hole, at least one resilient engaging piece engageable with the fixing hole to retain the leg when the leg is inserted to a specified position, and at least one bulging plate near a rear end of the leg in an inserting direction into the fixing hole and bulging out at an angle to the inserting direction;

the mounting portion includes a guide plate formed with a mount groove for receiving the leg, and at least one resilient plate spaced from the guide plate to define a space for holding the bulging plate a surface of the resilient plate facing the guide plate and a surface of the bulging plate opposite a side with the leg have engaging portions that are engageable with each other, the leg being insertable into the mount groove in mounting postures of the engaging part angularly displaced about the axial line of the leg, and the engaging portions being shaped to prevent withdrawal of the bulging plate from the space by engaging each other upon insertion of the bulging plate into the space, regardless of a mounting posture of the engaging part.

27. The protector of claim 26, wherein the bulging plate is substantially square.

28. The protector of claim 26, wherein an inserting portion of the leg inserted into the mount groove has a substantially square cross-section in a direction substantially orthogonal to the axial line of the leg.

29. The protector of claim 26, wherein the engaging portions are a projection on the resilient plate and a recess in the bulging plate.

30. The protector of claim 26, wherein the mounting portion is provided on each of the pair of split members.

31. The protector of claim 26, wherein the leg includes at least one projection for sandwiching the guide plate in cooperation with the bulging plate when the bulging plate is inserted into the space.

32. The protector of claim 31, wherein a plurality of projections are arranged at positions to sandwich the guide plate in cooperation with the bulging plate in any of the mounting postures of the engaging part.

33. The protector of claim 26, wherein the resilient plate extends substantially in the circumferential surface of the split member at an inner position of the split member and is supported at both ends.

34. The protector of claim 33, wherein opposite ends of each split member define tube engaging portions for engaging the corrugated tube, and the mounting portion is provided substantially between the tube engaging portions in the split member.

35. The protector of claim 26, wherein each of the split members has at least one main line portion for mounting on a main line of the wires and at least one branch for mounting on a branch line of the wires.

36. The protector of claim 35, wherein the engaging part is configured for mounting on the mounting portion by being inserted in a direction substantially parallel to the longitudinal direction of the branch line portion, and a surface of the resilient plate where the projection is provided and the outer surface of the branch are substantially flush.

37. The protector of claim 26, wherein at least one slanted surface inclined to widen the width of the mount groove toward the front side in the inserting direction of the leg is formed at an open end of the mount groove as an insertion opening for the engaging leg.

38. The protector of claim 26, wherein a slanted surface is formed at an open end of the accommodating portion as an insertion opening for the bulging plate and is inclined to widen the accommodating portion toward the front side in the inserting direction of the bulging plate.

39. The protector of claim 26, wherein a riding surface is formed on a front of the projection in the inserting direction of the engaging part and is inclined so that a projecting distance of the projection increases towards a back side in the inserting direction.

* * * * *